United States Patent
Misawa

(10) Patent No.: US 7,632,023 B2
(45) Date of Patent: Dec. 15, 2009

(54) CAMERA

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 413 days.

(21) Appl. No.: 11/640,896

(22) Filed: Dec. 19, 2006

(65) Prior Publication Data

US 2007/0140686 A1    Jun. 21, 2007

(30) Foreign Application Priority Data

Dec. 19, 2005   (JP) .............................. 2005-365332
Jan. 6, 2006    (JP) .............................. 2006-001688

(51) Int. Cl.
*G03B 17/04*   (2006.01)
*G03B 17/02*   (2006.01)

(52) U.S. Cl. .................. 396/348; 396/535; 396/540; 348/333.06; 352/137

(58) Field of Classification Search ............. 396/48, 396/50, 281, 303, 348, 419–421, 424, 428, 396/535, 540, 541, 529, 374; 348/333.06, 348/333.07, 333.08, 360, 373–376; 352/136–137; D16/200–236
See application file for complete search history.

(56) References Cited

U.S. PATENT DOCUMENTS 5,442,453 A * 8/1995 Takagi et al. ................. 386/118
5,664,243 A * 9/1997 Okada et al. ................. 396/246
6,181,381 B1 * 1/2001 Evans ..................... 348/333.01
7,084,919 B2 * 8/2006 Shibata et al. ........... 348/333.06
7,422,379 B2 * 9/2008 Agevik et al. ................ 396/424
2001/0004269 A1 * 6/2001 Shibata et al. .......... 348/333.06
2004/0174452 A1 * 9/2004 Kinemura et al. ....... 348/333.06
2005/0280732 A1 * 12/2005 Misawa .................. 348/333.06
2006/0013580 A1 * 1/2006 Horiguchi ................... 396/535
2007/0058972 A1 * 3/2007 Misawa ...................... 396/541
2007/0133977 A1 * 6/2007 Mayumi ..................... 396/348

FOREIGN PATENT DOCUMENTS

JP       11-15072 A         1/1999
JP    2001-211366 A         8/2001
JP    2004233722 A    *     8/2004
JP    2006319646 A    *    11/2006

OTHER PUBLICATIONS

Abstract machine translations of JP 2006319646A and JP 2004233722A provided.*
Detailed description machine translation of JP 2006319646A provided.*

* cited by examiner

*Primary Examiner*—WB Perkey
*Assistant Examiner*—Bret Adams
(74) *Attorney, Agent, or Firm*—Sughrue Mion, PLLC

(57) ABSTRACT

A camera comprising:
  a camera body on which an image taking lens and an image display portion are provided, and
  a grip portion connected to the camera body so as to be foldable and extendable,
  wherein the grip portion can be moved to a first position at which it is folded to cover the image display portion and to a second position at which it is extended to function as a grip.

6 Claims, 11 Drawing Sheets

FIRST POSITION

CAMERA

BACKGROUND OF THE INVENTION

1. Field of the Invention

The present invention relates to a camera and, more particularly, to a digital camera which has an image display portion, which is capable of maintaining holdability with a grip portion when used for image taking, and in which the image display portion is protected by the grip portion during carrying or when the camera is made compact.

2. Description of the Related Art

Japanese Patent Application Laid-Open No. 2001-211366 discloses a digital camera having a camera body in the form of a generally rectangular shape on which an image taking lens and an image pickup element are provided, and a grip portion having in its back surface a monitor on which a subject image taken with the image pickup element is displayed. The grip portion is turnably connected to a side portion of the image pickup unit.

In this digital camera, the camera body is turned relative to the grip portion so that the camera body and the grip portion have a flat form when the camera is made compact or carried, and an image taking posture is taken at the time of taking picture of a subject in front by turning the camera body frontward through 90 degrees relative to the grip portion.

That is, in the digital camera disclosed in Japanese Patent Application Laid-Open No. 2001-211366 as a camera changed in form between when made compact (carried) and when used for image taking, the camera body in the form of a generally rectangular shape is turnable relative to the grip portion in the form of a generally rectangular shape, is turned in a picture taking direction at the time of image taking, and is turned so that the entire camera has a flat rectangular form when the camera is to be made compact or carried.

The camera disclosed in Japanese Patent Application Laid-Open No. 2001-211366, however, is only constructed by connecting the camera body and the grip portion so that the camera body and the grip portion are relatively turnable, and has a drawback of requiring preparing a special cover and taking the trouble to placing the cover on the monitor provided in the grip portion to protect the monitor when the camera is carried or made compact. This is a matter of inconvenience.

In use of a lens-interchangeable camera having a large lens barrel, a user holds a grip portion of a camera body by his/her right hand and holds the lens barrel by his/her left hand in order to hold the camera with stability at the time of image taking.

A lens-interchangeable camera having a large lens barrel, however, has a grip portion extending laterally and, therefore, its portability is low. If the grip portion is reduced in size without deliberation for the purpose of improving portability, the weight balance between the camera body and the lens barrel becomes bad and the holdability and operability of the camera are reduced.

In recent years, progress has been made in reducing the entire size of digital cameras for the purpose of improving the portability as well as in increasing the screen size of liquid crystal displays (LCDs) for the purpose of improving the viewability. However, these purposes are contrary to each other and the size of the portion (grip portion) holdable at the time of image taking is reduced if the area occupied by the LCD is increased with respect to the size of the camera body. If the grip portion is reduced, the possibility of a user's finger being placed on the LCD to hide a portion of an image and the possibility of camera shake due to deterioration of the holdability are increased. A digital camera designed to ensure both the desired portability and holdability with stability by attaching a turnable grip to a side surface of a body, e.g., one disclosed in Japanese Patent Application Laid-Open No. 11-15072 is known.

LCDs are not sufficiently resistant to an external force such as pressure, and may be broken, for example, when hit during carrying. An increase in LCD screen size increases the risk of breakage by such an external force. It is, therefore, preferable to suitably protect an LCD during carrying, for example. The art disclosed in Japanese Patent Application Laid-Open No. 11-15072 lacks consideration of protection of an LCD. A detachable cover for protecting an LCD during carrying is known. However, the attachment and detachment of such a cover is troublesome and leads to a reduction in operability of the digital camera.

SUMMARY OF THE INVENTION

In view of the above-described circumstances, an object of the present invention is to provide a camera which has an image display portion, which is capable of conveniently protecting the display screen of the image display portion, and which can be made smaller in size when there is a need to carry or make compact the camera, more particularly, a camera which can be designed to accomplish objectives contrary to each other, i.e., an objective to ensure improved portability and an objective to ensure improved compactness, even in the case of a camera having a large barrel and not provided in slim form, while providing a holding in character during operation.

Another object of the present invention is to provide a digital camera which has a display device such as an LCD in its back surface, which ensures both portability and holdability with stability, and which is capable of protecting the display device without reducing the operability.

To achieve the above-described objects, according to a first aspect of the present invention, there is provided a camera including a camera body on which an image taking lens and an image display portion are provided, and a grip portion connected to the camera body so as to be foldable and extendable, wherein the grip portion can be moved to a first position at which it is folded to cover the image display portion and to a second position at which it is extended to function as a grip.

According to the first aspect, the grip portion can be moved to a first position at which it is folded relative to the camera body to cover the image display portion of the camera body when the camera is carried or made compact. In this way, the image display portion can be covered with the grip portion constituting the camera instead of being covered with a separate cover provided independently of the camera. Also, the image display portion can be covered by a simple operation, i.e., folding the grip portion, so that a user has no feeling of inconvenience. Since the grip portion extending laterally from the camera body is folded, the overall camera size is reduced to improve the portability and compactness. At the time of image taking, the grip portion is extended to set in the position at which it extends laterally from the camera body, i.e., the second position at which it functions as a grip. As a result, a form enabling the grip portion to be easily gripped is attained when the camera is used. Thus, according to the present invention, two objectives contrary to each other, i.e., the objective to ensure the holdability proper to a camera at the time of image taking, and the objective to obtain good portability and compactness even in the case of a camera having a large image taking lens barrel and not in slim form, can be accomplished. At the time of image taking, a user holds the grip portion by the right hand, operates the image taking button, and holds, by the left hand, the camera body, particularly the barrel of the image taking lens as in the case of holding a single-lens reflex camera if the size of the barrel of the image taking lens is large. Thus, this form is suitable for one-shot image taking. Preferably, a click mechanism for restricting the position of the grip portion to the first position and the second position is provided on a hinge portion provided as a turnable link portion.

According to a second aspect of the present invention, the camera in the first aspect further includes a position detection device which detects the position of the grip portion with respect to the camera body, and a switching device which, on the basis of the position detected by the position detection device, turns off a power supply for the camera at the first position and turns on the power supply at the second position.

According to the second aspect, the power supply for the camera is automatically turned on/off in linkage with the folding operation of the grip portion, thus eliminating the inconvenience of turning on/off the power supply by a special-purpose power switch and achieving good operability, e.g., fast shooting capability.

According to a third aspect of the present invention, the camera in the first aspect further includes a position detection device which detects the position of the grip portion with respect to the camera body, and a first changing device which, on the basis of the position detected by the position detection device, makes ineffective the on state of the power supply for the camera at the first position, and makes effective the on state of the power supply at the second position.

According to the third aspect, the on state of the power supply for the camera is made ineffective at the first position corresponding to the geometry at the time of carrying, thereby preventing an erroneous operation during carrying.

According to a fourth aspect of the present invention, the grip portion in the first to third aspects can be moved to a third position by being folded beyond the second position opposite from the first position.

According to the fourth aspect, when the grip portion is set in the third position, it is brought closer to the barycenter of the camera body and the user holding the grip portion can hold the grip portion without flexing the wrist of the right hand. Thus, the grip portion has a form suitable for long-time image taking. Correspondingly, the camera has a geometry proper to a camera and suitable for moving image taking, such that the camera is easy to hold. In this case, the user ordinarily holds the grip portion in the right hand and operates the recording button to start moving image taking. The left hand is not specially used to hold the camera. In the moving image taking mode, the image taking button is set in the non-operable state. Therefore, even if the image taking button is inadvertently operated, no hindrance to moving image taking occurs. Preferably, a click mechanism for restricting the position of the grip portion to the third position and a turning angle limiting mechanism for stopping the grip portion from further turning from the third position are provided on the hinge portion as the turnable link portion.

According to a fifth aspect of the present invention, the camera in the fourth aspect further includes a second changing device which changes the operating mode to a still image taking mode when the grip portion is in the second position, and which changes the operating mode to a moving image taking mode when the grip portion is in the third position.

According to the fifth aspect, transitions between the modes: carrying (making compact)→still image taking→moving image taking→still image taking→carrying (making compact) can be automatically made by a second changing device by a simple operation: continuously moving the grip portion to the first position, to the second position and to the third position. Also, the user can clearly recognize the present mode of the digital camera through the geometry of the grip portion and, therefore, can intuitively perform an operation according to the operating mode.

According to a sixth aspect of the present invention, the camera further includes a selecting device which selects from a plurality of modes including a moving image taking mode and a still image taking mode, and a selected state changing device which enables selection of the still image taking mode when the grip portion is in the second position, and which enables selection of the moving image taking mode when the grip portion is in the third position.

According to the sixth aspect, the still image taking mode can be selected by the selected state changing device when the grip portion is set in the second position, and the moving image taking mode can be selected by the selected state changing device when the grip portion is set in the third position. That is, the mode is not forcibly changed on the basis of the position of the grip portion; the mode suitable in correspondence with the position of the grip portion can be selected.

According to a seventh aspect of the present invention, the image taking lens in first to sixth aspects is detachably attached to the camera body, the camera further including a third changing device which changes the operating mode of the camera to a predetermined mode according to information detected by an attachment/detachment detection device which detects the detachment and attachment of the lens.

According to the seventh aspect, when the attachment/detachment detection device detects the absence of the lens attached to the camera body, the third changing device automatically change the camera mode to a predetermined mode, e.g., a photoplayer mode such as a moving image reproduction mode or a still image reproduction mode, or a music player mode, thereby enabling intuitive operation even in such a player mode when the lens is not attached.

To achieve the above-described objects, according to an eighth aspect of the present invention, there is also provided a digital camera having a display device on which an image taken by an image pickup element or an image recorded on a recording medium is displayed, a camera body having the display device provided in its back surface, and a grip portion attached to the camera body and capable of moving between a compact state in which it is positioned on the back surface of the camera body to cover the display device and a holdable state in which it is positioned outside a side portion of the camera body.

Preferably, the grip portion is attached to the camera body by a link mechanism which turnably supports each of the grip portion and the camera body.

Preferably, the camera body has a mode setting device which sets one of a still image taking mode for performing still image taking, a moving image taking mode for performing moving image taking and a replay mode for reproducing and displaying an image recorded on the recording medium.

Preferably, each of the camera body and the grip portion is formed into a generally rectangular shape, and the surface of the grip portion opposed to the back surface when the grip portion is in the compact state is generally parallel to the back surface when the grip portion is in the holdable state.

The arrangement may be such that each of the camera body and the grip portion is formed into a generally rectangular shape, and the grip portion in the holdable state has a first state in which its surface opposed to the back surface when the grip portion is in the compact state is generally parallel to the back surface, and a second state in which the opposed surface and the back surface are made non-parallel to each other by turning on an axis in a top-bottom direction of the camera body.

Preferably, in such a case, a position detection device which detects the state of the grip portion is provided on one of the camera body and the grip portion, and the mode setting device sets, based on the detection result of the position detection device, the still image taking mode when the grip portion is in the first state, and sets the moving image taking mode when the grip portion is in the second state.

Preferably, the camera body is constructed so that an image taking lens through which subject light is imaged on the image pickup element can be detachably attached to the camera body, the camera body having a lens detection device which detects the existence/nonexistence of the image taking lens, the mode setting device setting the replay mode when the lens detection device detects the absence of the image taking lens.

Preferably, the grip portion has in the opposed surface an operating portion for inputting various commands to the camera body, and the back surface and the opposed surface are made generally parallel to each other and the opposed surface faces in the same direction as the back surface when the grip portion is in the first state.

Preferably, the link mechanism is constituted by an arm formed into the shape of a plate or a rod, a first hinge portion which is formed on a side end portion of the camera body and which turnably supports one end of the arm on an axis in a top-bottom direction, and a second hinge portion which is formed on an end of the grip portion and which turnably supports the other end of the arm on an axis in a top-bottom direction; the grip portion is moved to the compact state while covering the display device so that the second hinge portion is positioned at an end opposite from the first hinge portion; the grip portion is moved to the first state in which the opposed surface and the back surface are generally parallel to each other and in which the opposed surface faces in the same direction as the back surface, by turning the arm so that the arm projects in a direction generally perpendicular to one side end of the camera body at which the first hinge portion is formed, and by turning the grip portion so that the grip portion overlaps the arm; and the grip portion is moved to the second state by turning the arm so that the second hinge portion is positioned outside the one side surface of the camera body at which the first hinge portion is formed, and by turning the grip portion so that the opposed surface becomes generally perpendicular to the back surface.

Preferably, the camera body has a power supply control device which supplies power to components, the power supply control device supplying power in response to the detection of the holdable state of the grip portion by the position detection device, the power supply control device stopping supplying power in response to the detection of the compact state of the grip portion by the position detection device.

The camera according to the present invention is capable of protecting the display screen of the image display portion without requiring any troublesome operation, can be designed so as to be made smaller in size when there is a need to carry or make compact the camera, and can be designed to accomplish objectives contrary to each other, i.e., an objective to ensure improved portability and an objective to ensure improved compactness, even in the case of a camera having a large barrel and not provided in slim form, while providing a holding in character during operation.

The digital camera according to the present invention is provided with a grip portion which is attached to the camera body, and which can be moved to a compact state in which it is positioned on the back surface side to cover a display device, and to a holdable state in which it is positioned outside a side end portion of the camera body. When the grip portion is in the holdable state in which it is positioned outside the side end portion, the stable holdability can be obtained while reducing the possibility of placement of a finger on the display device. When the grip portion is in the compact state in which it is positioned on the back surface side of the camera body, the camera is made compact to improve the portability. Also, the display device is protected. Exposure and protection of the display device are performed in linkage with the movement of the grip portion. Therefore, there is no anxiety about a reduction in operability.

DETAILED DESCRIPTION OF THE PREFERRED EMBODIMENTS

A first preferred embodiment of the camera according to the present invention will be described with reference to the accompanying drawings.

Figure 1:
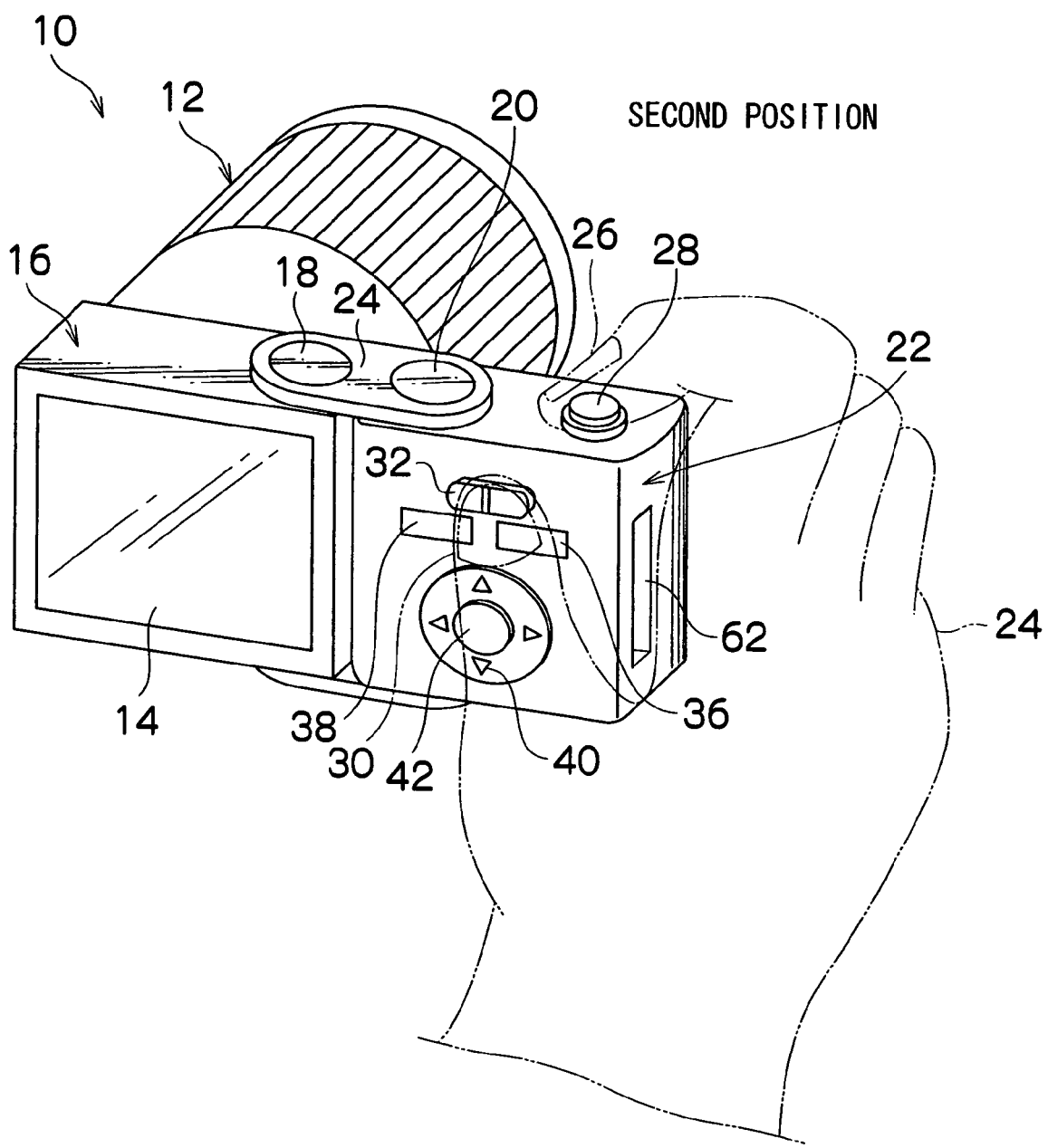
FIG. 1 is an entire perspective view of the digital camera of a first embodiment when the digital camera is in a still image taking mode.

The embodiment of the digital camera 10 shown in FIG. 1 is constituted by a camera body 16 provided with an image taking lens 12 having a large lens barrel and with a liquid crystal monitor 14 (image display unit), and a grip portion 22 connected to the camera body 16 so as to be foldable and extendable by being moved on a pair of hinge shafts 18 and 20.

Figure 2:
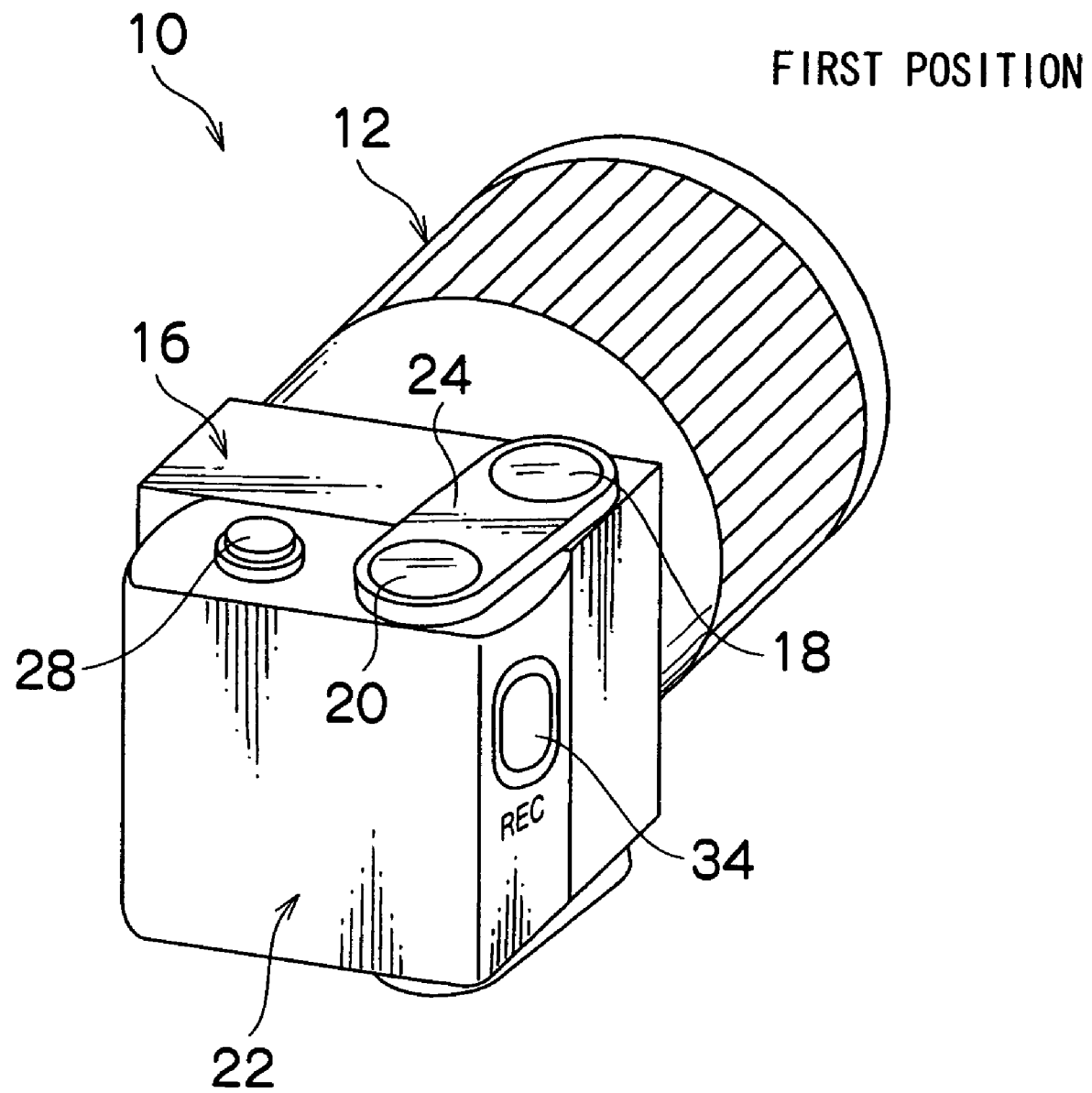
FIG. 2 is an entire perspective view of the digital camera of the first embodiment when the digital camera is in a compact state.
Figure 4:
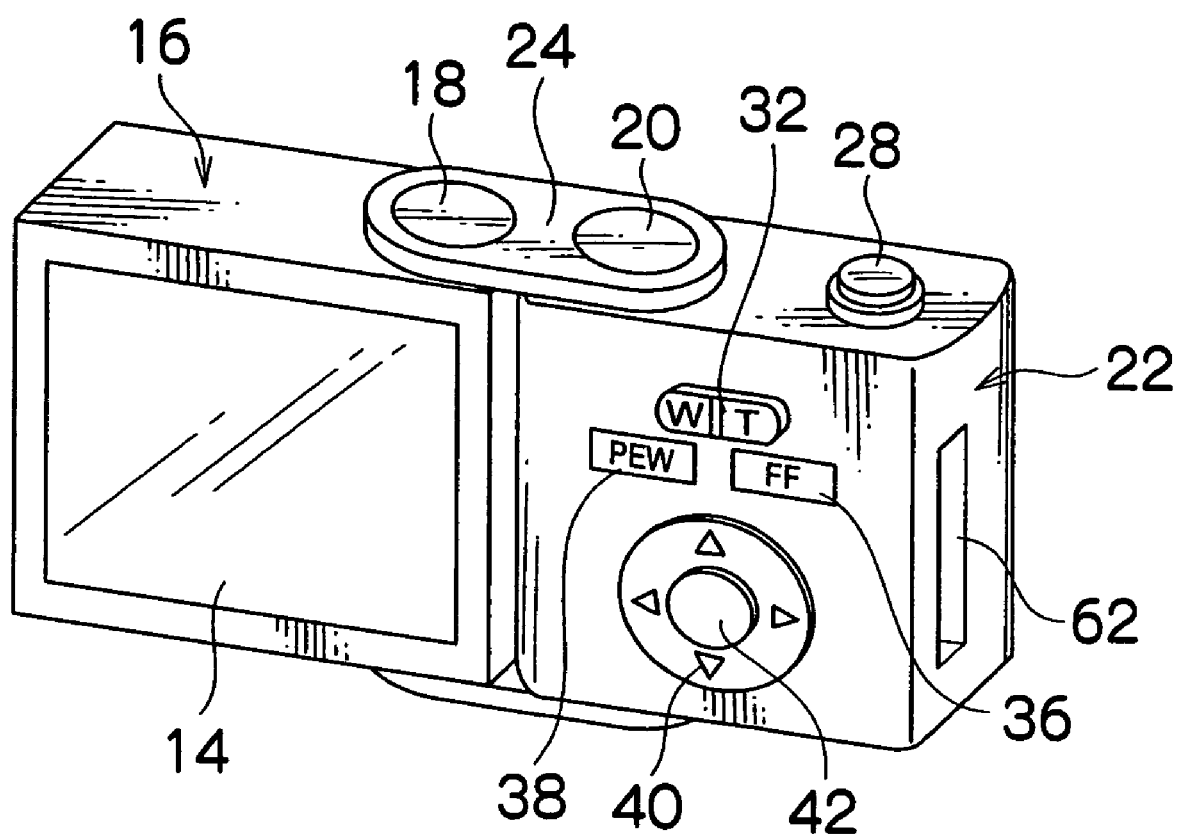
FIG. 4 is a perspective view of the digital camera of the first embodiment when an image taking lens is removed from the camera.

The digital camera 10 is constructed so as to be movable between a first position at which the grip portion 22 is held in a folded state by the pair of the hinge shafts 18 and 20 such as to cover the liquid crystal monitor 14 as shown in FIG. 2, a second position at which the grip portion 22 is held in an extended state by the pair of the hinge shafts 18 and 20 such as to function as a grip as shown in FIG. 1, and a third position at which the grip portion 22 is held in a folded state after being moved opposite from the first position (see FIG. 2) beyond the second position (see FIG. 1). The image taking lens 12 is a lens unit having a lens portion and a charge-coupled device (CCD) (solid-state image pickup device) combined integrally with each other. The image taking lens 12 is detachably attached to a front portion of the camera body 16 by means of a lens mount and is interchangeable with a lens unit of different specifications. FIG. 4 shows an external appearance of the digital camera 10 after the image taking lens 12 has been removed.

Figure 3:
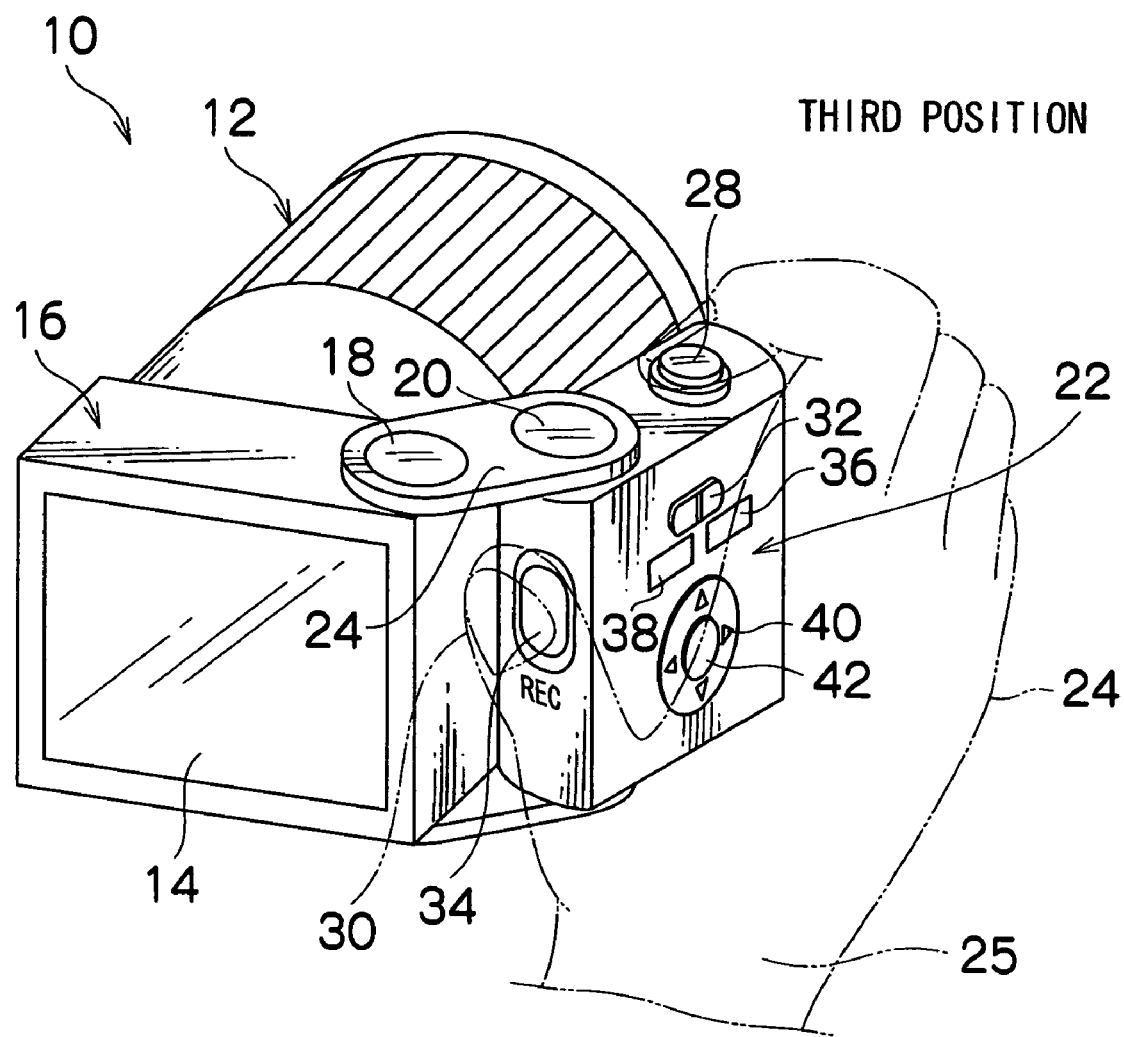
FIG. 3 is an entire perspective view of the digital camera of the first embodiment when the digital camera is in a moving image taking mode.

A click mechanism for restricting the position of the grip portion 22 to the first position shown in FIG. 2 is provided on the hinge shafts 18 and 20; a stopper for restricting the position of the grip portion 22 to the second position shown in FIG. 1 and for limiting the angle of rotation thereof is provided on the hinge shaft 18; and a stopper for restricting the position of the grip portion 22 to the third position shown in FIG. 3 and for limiting the angle of rotation thereof is provided on the hinge shaft 20. The click mechanism and the stoppers are not shown in the figures. The click mechanism may be a well-known mechanism for limiting movement at a recess or a projection by flitting to the recess or the projection or some other mechanism. The stopper may be of a mechanical construction comprising the hinge shaft 18 or 20 and a stopper member contacting a member rotatable relative to the hinge shaft 18 or 20. The stopper member contacts the rotatable member to limit the rotation of the hinge shaft 18 or 20.

The first position shown in FIG. 2 corresponds to the geometry of the digital camera 10 when the digital camera 10 is carried or made compact, and to a state where a surface of the liquid crystal monitor 14 provided in a back surface of the camera body 16 is protected by the grip portion 22. When in this state the grip portion 22 is turned in the direction of opening from the camera body 16 (extending direction), arms 24 and the grip portion 22 are respectively turned on the hinge shafts 18 and 20 relative to the camera body 16 to change the camera body 16 and the grip portion 22 into a form on a straight line as shown in FIG. 1, such that the grip portion 22 is in the second position extending laterally from the camera body 16. An image taking button 28 is provided in an upper surface of the grip portion 22 so as to be operable in the second position by the forefinger 26 of a user's right hand 24 indicated by the double-dot-dash line while the grip portion 22 is being held by the user's hand. When the image taking button 28 is operated, one-shot or continuous-shooting still image taking is performed. A zoom button 32 in a still image operating system is also provided in a back surface of the grip portion 22 so as to be operable by the thumb 30 of the user's right hand 24 indicated by the double-dot-dash line. When the grip portion 22 is in the second position, a recording (REC) button 34 (see FIG. 2 or 3) to be used at the time of moving image taking is hidden.

When the grip portion 22 is moved to the third position shown in FIG. 3, the recording button 34 provided in an inner side surface of the grip portion 22 is exposed to enable an operation on the recording button 34 for moving image taking to be performed by the thumb 30 of the user's right hand 24 indicated by the double-dot-dash line. When the grip portion 22 is returned from this state to the state shown in FIG. 2 by being folded in the reverse direction, the camera is made easier to carry and the screen of the liquid crystal monitor 14 is protected by being covered with the grip portion 22.

As shown in FIG. 1, a group of various operating buttons disposed in the back surface of the grip portion 22 include, in order from the uppermost position, the zoom button 32, a replay button 36, a photomode button 38, a menu/OK button 42 and a cross button 40.

The zoom button 32 is operated when the focal distance is adjusted to a telephoto position or a widephoto position. The zoom button 32 is also operated in the still image taking mode and in the moving image taking mode. The replay button 36 is operated when there is a need to immediately reproduce a taken image. The replay button 36 is operated in an image replay mode in each of the still image taking mode and in the moving image taking mode. The photomode button 38 is a button for switching between color image taking and monochrome image taking. The photomode button 38 is operated only in the still image taking mode. The menu/OK button 42 is an operating key having both a menu button function for inputting a command to display a menu on the screen of the liquid crystal monitor 14 and an OK button function for inputting a command to enter a selection detail and execute a corresponding operation. The cross key 40 is provided so as to be tiltable in four directions: up, down, left and right directions and is used as an operating key for selecting from various setting items, changing a setting detail and erasing a recorded image. The image taking button 28 provided in the upper surface of the grip portion 22 is operable only in the still image taking mode. When the image taking button 28 is half depressed, focusing is performed. A subject image is imaged on the CCD through the image taking lens 12 by fully depressing the image taking button 28 after half depression.

In the embodiment of the digital camera 10, a power supply is off when the grip portion 22 is in the first position shown in FIG. 2. When the grip portion 22 is set in the second position shown in FIG. 1 by being extended, the power supply is automatically turned on and the operation mode is automatically set in the still image taking mode. Further, when the grip portion 22 is set in the third position shown in FIG. 3 by being folded, the powered-on state is maintained and the operation mode is automatically changed to the moving image taking mode. This powering on/off and mode change will be described below.

Figure 5:
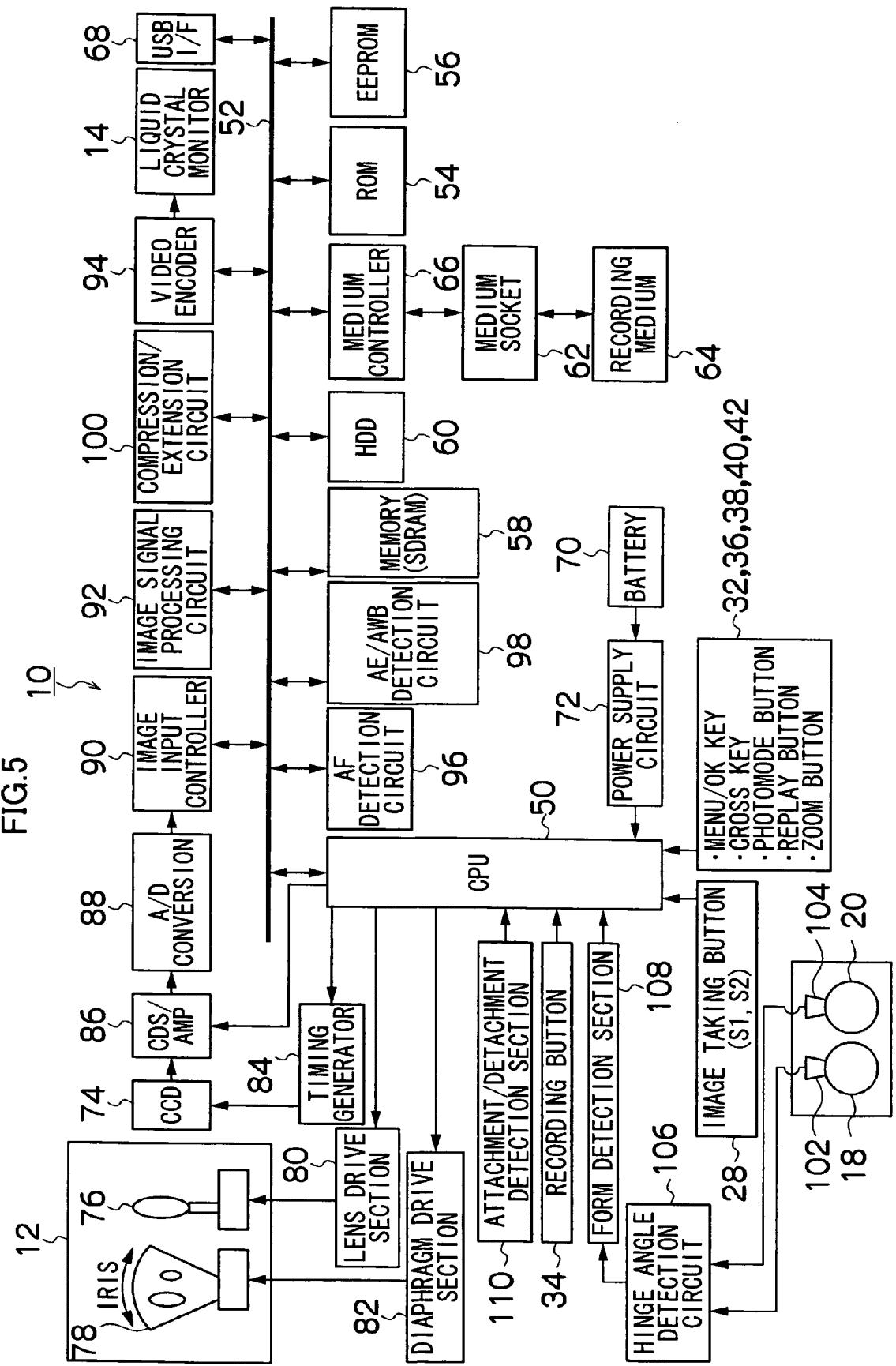
FIG. 5 is a block diagram showing the entire configuration of the digital camera of the first embodiment.

FIG. 5 is a block diagram showing the entire configuration of the digital camera 10. A central processing unit (CPU) 50 performs general control on the overall operation of the digital camera 10. The CPU 50 functions as a system control circuit section for controlling the camera system according to a predetermined program and also as a computation device for performing various computations including automatic exposure (AE) computation, automatic focusing (AF) computation and white balancing (WB) computation.

In a read-only memory (ROM) 54 connected to the CPU 50 via a bus 52 are stored programs executed by the CPU 50, various sorts of data necessary for control, etc. In an electrically erasable programmable ROM (EEPROM) 56 are stored CCD pixel defect information, various constants/information relating to camera operations, etc.

A memory (SDRAM) 58 is used as an area for loading of a program or for computation performed by the CPU 50, and is also used as an area for temporarily storing image data or audio data. A recording unit (HDD) 60 is a temporary storage medium specially for storage of image data. Data stored in the recording unit 60 can be erased by an operation on the cross key 40.

The digital camera 10 has a medium socket 62 in an outer surface of the grip portion 22 (see FIG. 1). A recording medium 64 is set in the medium socket 62. The form of the recording medium 64 is not particularly specified. Any of various mediums such as semiconductor memory cards typified by xD-Picture Card and SmartMedia (trademarks), portable small hard disks, magnetic disks, optical disks and magneto-optical disks can be used as the recording medium 64.

A medium controller 66 performs necessary signal conversion for exchange of input/output signals suitable for the recording medium 64 set in the medium socket 62.

The digital camera 10 also has a USB interface 68 as a communication device for connection to external devices including a personal computer. An external device is connected via a USB cable (not shown) to a connector connected as a communication terminal to the USB interface 68, thereby enabling exchange of data such as image data between the digital camera 10 and the external device. Needless to say, any other communication system may be used instead of USB.

Still image and moving image taking functions of the digital camera 10 will be described.

When the still image taking mode or the moving image taking mode is set by moving the grip portion 22 to the second or third position as shown in FIG. 1 or 3, power is supplied from a battery 70 to the CPU 50 and to an image pickup section including a CCD 74 via a power supply circuit 72 to enable image taking.

The image taking lens 12 is an optical unit including a lens unit 76 and a mechanical shutter 78 also functioning as a diaphragm. The image taking lens 12 is electrically driven by a lens drive section 80 and a diaphragm drive section 82 controlled by the CPU 50 to perform zoom control, focusing control and iris control.

Subject light which has passed through the image taking lens 12 is imaged on the light receiving surface of the CCD 74. A multiplicity of photodiodes (light receiving elements) are two-dimensionally arrayed in the light receiving surface of the CCD 74. Red (R), green (G) and blue (B) segments of a primary color filter are arranged in a predetermined array structure in correspondence with the photodiodes. The CCD 74 has an electronic shutter function to control the charge accumulation time (shutter speed) with respect to each photodiode. The CPU 50 controls the charge accumulation time in the CCD 74 through a timing generator 84. A different type of image pickup device such as a MOS-type image pickup device may be used in place of the CCD 74.

A subject image formed on the light receiving surface of the CCD 74 is converted into signal charges according to the quantities of incident light by the photodiodes. The signal charges accumulated in the photodiodes are successively read out as voltage signals (image signals) according to the signal charges on the basis of drive pulses supplied from the timing generator 84 according to a command from the CPU 50.

The signal output from the CCD 74 is sent to an analog processing section (CDS/AMP) 86. R, G and B signals for the pixels are sampled and held (by correlative double sampling processing) in the analog processing section 86. The sampled and held signals are amplified and then supplied to an A/D converter 88. Dot-sequential R, G and B signals that have been converted to digital signals by the A/D converter 88 are stored in the memory 58 via an image input controller 90.

An image signal processing circuit 92 processes the R, G and B signals stored in the memory 58 according to a command from the CPU 50. That is, the image signal processing circuit 92 functions as an image processing device including a synchronization circuit (a circuit for converting the color signals into synchronized colors by correcting spatial deviations of the color signals accompanying the color filter array on the single CCD), a white balance correction circuit, a gamma correction circuit, a contour correction circuit and a luminance and color difference signal generation circuit, and performs predetermined signal processing while using the memory 58 according to a command from the CPU 50.

RGB image data input to the image signal processing circuit 92 is converted into a luminance signal and a color difference signal in the image, and these signal undergo predetermined processing including gamma correction in the signal processing circuit 92. The image data processed in the image signal processing circuit 92 is recorded in the recording unit 60.

When a reproduced taken image is output to the liquid crystal monitor 14, image data is read out from the recording unit 60 and sent to a video encoder 94 via the bus 52. The video encoder 94 converts the input image data into a signal in a predetermined format for display (e.g., a color composite video signal in accordance with the NTSC system) and outputs the converted signal to the liquid crystal monitor 14. A through signal at the time of image taking is supplied from the image signal processing circuit 92 to the liquid crystal motor 14 via the bus 52 and the video encoder 94 to be immediately displayed on the liquid crystal motor 14.

When the image taking button 28 is half depressed to turn on a switch S1, the digital camera 10 starts AE and AF processing. That is, the image signal output from the CCD 74 undergoes A/D conversion and is thereafter input to an AF detection circuit 96 and to an AE/AWB detection circuit 98 via an image input controller 90.

The AE/AWB detection circuit 98 includes a circuit for dividing one frame into a plurality of areas (e.g., 16×16) and totalizing the RGB signals with respect to each of the divided areas, and provides the totalized values to the CPU 50. The CPU 50 detects the luminance of the subject (subject luminance) from the totalized values obtained from the AE/AWB detection circuit 98 and computes an exposure value (image taking EV value) suitable for image taking. The diaphragm value and the shutter speed are determined according to the exposure value and a predetermined program diagram. The CPU 50 controls the electronic shutter and iris of the CCD 74 according to the determined diaphragm value and the shutter speed to obtain the suitable amount of exposure.

At the time of automatic white balancing, the AE/AWB detection circuit 98 computes average totalized values of the RGB signals on a color-by-color basis with respect to each of the divided areas and provides the computation results to the CPU 50. The CPU 50 obtains the totalized R value, the totalized B value and the totalized G value, obtains the R/G ratio and B/G ratio with respect to each divided area, identifies the kind of the light source on the basis of the distributions of R/G and B/G in the R/G and B/G color space and other factors, and corrects the signals in the color channels by controlling the gain values (white balance correction vales) with respect to the R, G and B signals in the white balancing circuit according to white balancing values suitable for the identified kind of light source so that the value of each ratio is approximately equal to 1. If the gain values in the white balancing circuit are adjusted so that each ratio has a value other than 1, an image having a certain remaining color tone can be formed.

An AF method applied to AF control in the digital camera 10 is, for example, contrast AF performed by moving a focusing lens (a movable lens contributing to focusing in the lens optical system constituting the lens unit 76) so that a high-frequency component of the G signal in the video signal is maximized. That is, the AF detection circuit 96 is constituted by a high-pass filter which allows only a high-frequency component of the G signal to pass therethrough, an absolute valuing processing circuit, an AF area extraction section which cuts out a signal in a focusing area set in advance in the frame (e.g., a center of the frame), and totalization section which totalizes absolute value data within the AF area.

The CPU 50 is notified of totalized value data obtained by the AF detection circuit 96. The CPU computes a focus evaluation value (AF evaluation value) at a plurality of AF detection points while moving the focusing lens by controlling the lens drive section 80, determines as an in-focus position the lens position at which the evaluation value is maximized, and controls the lens drive section 80 so that the focusing lens is moved to the obtained in-focus position. AF evaluation value computation is not limited to the implementation using the G signal. A luminance signal (Y signal) may alternatively used.

The image taking button 28 is half depressed and the switch S1 is thereby turned on to perform AE/AF processing. The image taking button 28 is fully depressed to turn on a switch S2 to start an image taking operation for recording. Image data obtained in response to S2 turning on is converted into luminance/color-color difference signals (Y/C signals) in the image signal processing circuit 92. The signals undergo predetermined processing including gamma correction and are thereafter stored in the memory 58.

The Y/C signals stored in the memory 58 are compressed in accordance with a predetermined format by a compression/expansion circuit 100 and are thereafter recorded on a recording medium 48 via a media controller 66. A still image is recorded in the JPEG format for example.

Thereafter, when the replay button 36 is operated, the compressed data on the final image file (a file last recorded) recorded in the recording unit 60 or on the recording medium 64 is read out. If the file for the last recording is a still image file, the compressed image data read out is expanded to restore the YC signals in the uncompressed state via the compression/expansion circuit 100. The YC signals are output to the liquid crystal monitor 14 through the image signal processing circuit 92 and the video encoder 94. The image contents of the file are thereby displayed on the screen of the liquid crystal monitor 14.

Powering on/off and automatic mode (carrying or making compact (off)/still image taking mode/the moving image taking mode) change of the digital camera 10 will be described.

A switch for turning on/off the power supply for the digital camera 10 and a switch for mode change are embedded in the hinge shafts 18 and 20 connecting the camera body 16 and the grip portion 22 as shown in FIG. 1. Mode change to the off state/the still image taking mode/the moving image taking mode is made by changing the geometry of the grip portion 22 of the digital camera 10.

As shown in FIG. 5, information indicating the rotational angles of the hinge shafts 18 and 20 is output from a switch (position detection device) 102 for detecting the rotational angle of the hinge shaft 18 relative to the camera body 16 and a switch (position detection device) 104 for detecting the rotational angle of the hinge shaft 20 relative to the arms 24 to a form detection section 108 through a hinge angle detection section 106. When the completion of the movement of the grip portion 22 to the second position is confirmed by the form detection section 108 on the basis of the information from the switches 102 and 104, the CPU 50 (switching device: first changing device) turns on the power supply for the digital camera 10 and sets the operating mode to the still image taking mode. When the completion of the movement of the grip portion 22 to the third position is confirmed by the form detection section 108 on the basis of the information from the switch 104, the CPU 50 changes the operating mode from the still image taking mode to the moving image taking mode while maintaining the on state of the power supply for the digital camera 10.

An attachment/detachment detection section (attachment/detachment detection device) 110 for detecting attachment/detachment of the image taking lens 12 to or from the camera body 16 is incorporated in the digital camera 10 to enable detection as to whether the image taking lens 12 has been attached or detached. For example, the attachment/detachment detection section 110 is constructed so that a lens unit detection switch is pressed by a claw on the image taking lens 12 side.

When the image taking lens 12 is attached to the camera body 16, mode change to the off state/the still image taking mode/the moving image taking mode is made as described above. In the state shown in FIG. 4, where the image taking lens 12 is detached from the camera body 16, mode change to an off/player mode is made. The CPU (second changing device) 50 effects this change.

In the player mode, a moving picture, a still image, a piece of music or the like recorded on recording medium 64 is reproduced. A speaker may be provided in the camera body 16 or in the grip portion 22. Thus, when the image taking lens 12 is attached, only what users need to do is changing the geometry of the digital camera 10 to the carrying form shown in FIG. 2, the still image taking mode form shown in FIG. 1 or the moving image taking mode form shown in FIG. 3. When the image taking lens 12 is detached, non-use as the digital camera 10 is recognized and the digital camera 10 can be used as a photo player or a music player.

Figure 6A:
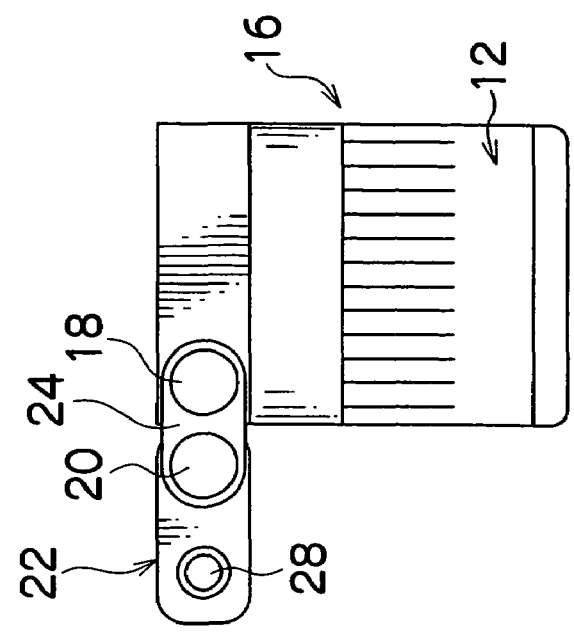
FIGS. 6A to 6C are plan views of three geometries of the digital camera of the first embodiment.
Figure 6B:
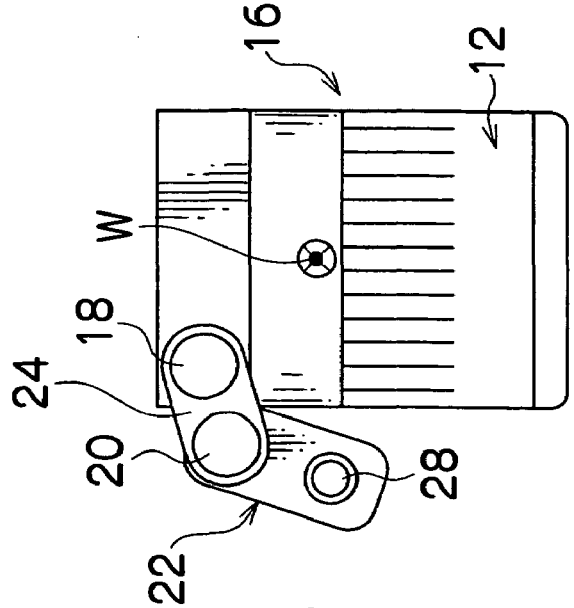
Figure 6C:
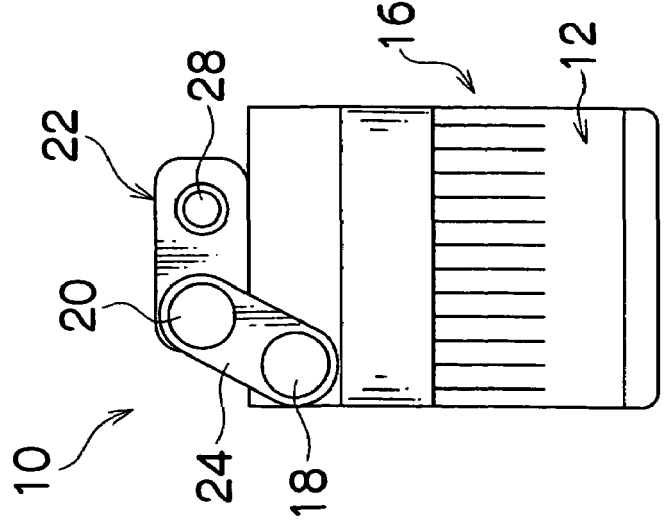

FIGS. 6A, 6B, and 6C are plan views of the digital camera 10 with respect to the three positions to which the position of the grip portion 22 is restricted by the click mechanism.

FIG. 6A shows the first position at which the liquid crystal monitor 14 is covered, FIG. 6C the second position when the still image taking mode is selected, and FIG. 6B the third position when the moving image taking mode is selected.

As shown in FIG. 6B, when the grip portion 22 is set in the third position, it is brought closer to the barycenter W of the camera main body 16 and the user holding the grip portion 22 can hold the grip portion 22 without flexing the wrist 25 of the right hand 24, as shown in FIG. 3. Thus, the grip portion 22 has a form suitable for long-time image taking. Correspondingly, the digital camera 10 has a geometry proper to a camera and suitable for moving image taking, such that the camera is easy to hold. In this case, the user ordinarily holds the grip portion 22 in the right hand 24 and operates the recording button 34 to start moving image taking. The left hand is not specially used to hold the digital camera 10. In the moving image taking mode, the CPU 50 sets the image taking button 28 so that the image taking button 28 cannot be operated. Even if the image taking button 28 is inadvertently operated, no hindrance to moving image taking occurs.

As described above, when the image taking lens 12 is attached in the embodiment of the digital camera 10, the geometry shown in FIG. 1 corresponds to the still image taking mode; the geometry shown in FIG. 2, the power off state; and the geometry shown in FIG. 3, the moving image taking mode. When the image taking lens 12 is not attached, the geometry shown in FIG. 1 corresponds to the player mode; the geometry shown in FIG. 2, the power off state; and the geometry shown in FIG. 3, a state where an error message is displayed on the liquid crystal display monitor 14. For example, a setting may be made to turn off the power supply after displaying an error message. Also, another setting may be made for orientation-changed display in the player mode. Conveniently, the display orientation can be changed in a one-touch manner in such a case.

Figure 7:
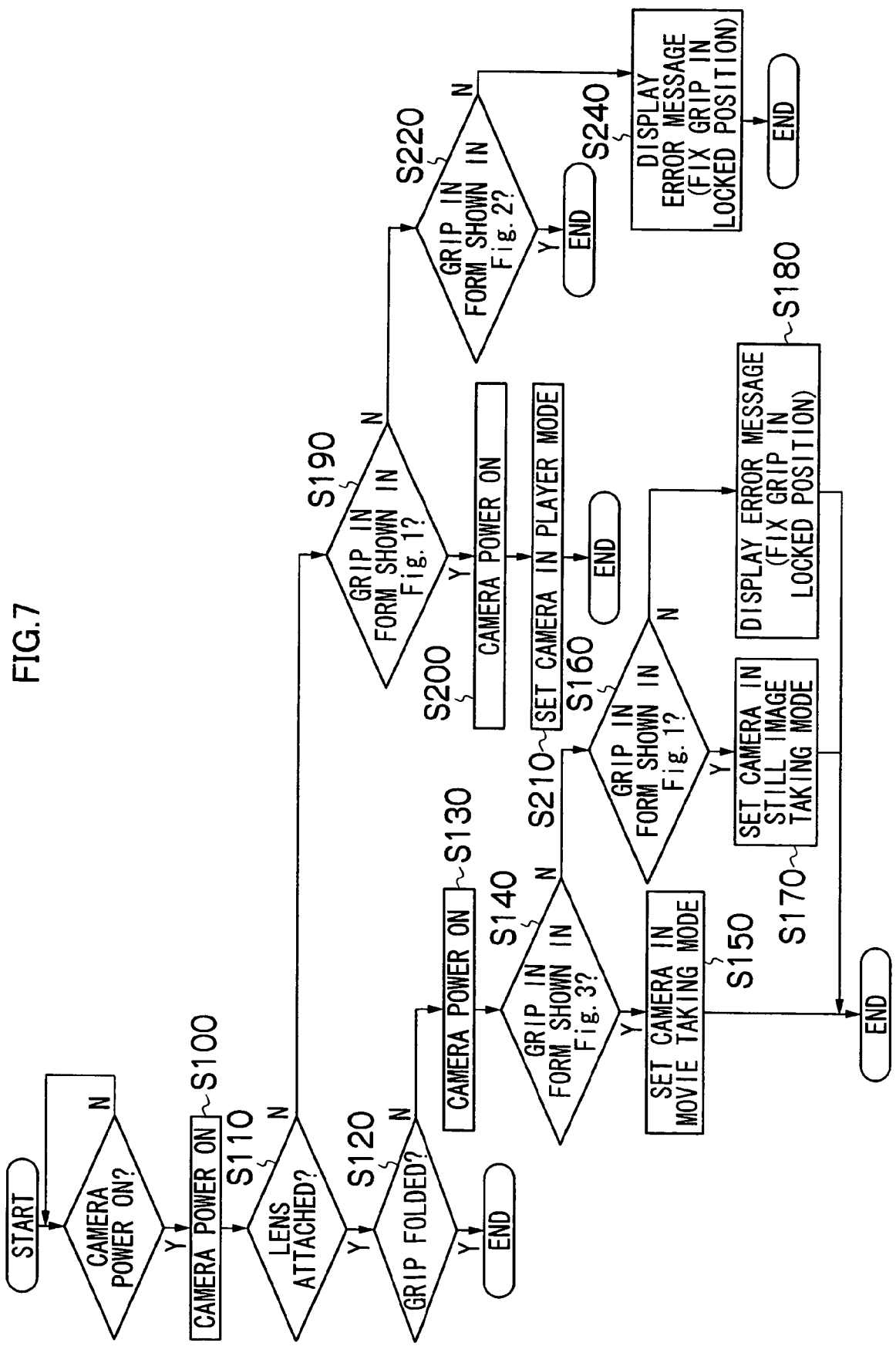
FIG. 7 is a flowchart showing the operation of the digital camera of the first embodiment.

Use of the digital camera 10 constructed as described above will be described with reference to the flowchart in FIG. 7.

The grip portion 22 is extended from the first position where the power supply is off to the second position or folded to the third position to turn on the power supply (S100). The attachment/detachment detection section 110 detects whether or not the image taking lens 12 is attached (S110). If the detection result is that the image taking lens 12 is attached, and if the grip portion 22 is not in the first position in the refracted (folded) state (S120), the powered-on state is maintained (S130).

Thereafter, if the form (geometry) of the grip portion 22 is the geometry shown in FIG. 3 (S140), the CPU 50 sets the mode of the digital camera 10 to the moving image taking mode according to the output from the form detection section 108 based on the switches 102 and 104 (S150). If the form (geometry) of the grip portion 22 is the geometry shown in FIG. 3 (S160), the CPU 50 sets the mode of the digital camera 10 to the still image taking mode according to the output from the form detection section 108 based on the switches 102 and 104 (S170). If the geometry of the grip portion 22 is neither of the geometry shown in FIG. 3 and the geometry shown in FIG. 1, an error message "Fix grip in locked position" is displayed on the liquid crystal monitor 14 (S180).

If the result of detection by the attachment/detachment detection section 110 in S110 is that the image taking lens 12 is not attached to the camera body 16, and if the rip portion 22 is in the geometry shown in FIG. 1 (S190), the power supply is turned on S200) and the CPU 50 sets the mode of the digital camera 10 to the player mode (S210). If the grip portion 22 is in the geometry shown in FIG. 2 (S220), the power supply is turned off (S230). Further, if the geometry of the grip portion 22 is neither of the geometry shown in FIG. 1 and the geometry shown in FIG. 2, an error message "Fix grip in locked position" is displayed on the liquid crystal monitor 14 (S240).

In the embodiment of the digital camera 10, as described above, mode change to a suitable mode can be made only by moving the grip portion 22 to one of the three possible positions for the grip portion 22 in the state where the image taking lens 12 is attached to the camera body 16. Also, in the state where image taking lens 12 is not attached to the camera body 16, mode change to a suitable mode can be made only by moving the grip portion 22 to one of the two possible positions for the grip portion 22. Thus, the digital camera 10 is advantageously easy for a user to handle.

The essential feature of the embodiment of the digital camera 10 resides in that the grip portion 22 can be folded with respect to the camera body 16 to be set in the first position in which it covers the liquid crystal monitor 14 of the camera body 16 when the digital camera 10 is carried or made compact. In this way, the liquid crystal monitor 14 can be covered with the grip portion 22 constituting the digital camera 10 without being covered with a separate cover provided independently of the digital camera 10. Also, the liquid crystal monitor 14 can be covered by a simple operation comprising folding the grip portion 22. A user can perform this operation without having a feeling of troublesomeness. Further, since the grip portion 22 extending laterally from the camera body 16 is folded, the entire size of the digital camera 10 is reduced and the portability and compactness are improved.

At the time of image taking, the grip portion 22 is extended to be set in the position in which it extends laterally from the camera body 16, i.e., the second position in which it functions as a grip, and is thus set in such a form as to be easy to grip.

Thus, with this digital camera 10, two objectives contrary to each other, i.e., the objective to ensure the holdability proper to a camera when operated, and the objective to obtain good portability and compactness even in the case of a camera having a large image taking lens barrel and not in slim form, can be accomplished.

At the time of image taking, a user holds the grip portion 22 by the right hand 24 and operates the image taking button 28 as shown in FIG. 1, and holds, by the left hand (not shown), the camera body 16, particularly the barrel of the image taking lens 12 as in the case of holding a single-lens reflex camera if the size of the image taking lens 12 is large. Thus, this form is suitable for one-shot image taking.

When the grip portion 22 is set in the third position shown in FIG. 3, it is brought closer to the barycenter W of the camera body 16 as shown in FIG. 6C and the user holding the grip portion 22 can hold the grip portion 22 without flexing the right hand wrist, as shown in FIG. 3. Thus, the grip portion 22 has a form suitable for long-time image taking.

Correspondingly, the digital camera 10 has a geometry proper to a camera and suitable for moving image taking, such that the camera is easy to hold. In this case, the user ordinarily holds the grip portion 22 in the right hand 24 and operates the recording button 34 to start moving image taking. The left hand is not specially used to hold the camera body 16. In the moving image taking mode, the CPU 50 sets the image taking button 28 so that the image taking button 28 cannot be operated. Therefore, even if the image taking button 28 is inadvertently operated, no hindrance to moving image taking occurs.

As described above, transitions between the modes (carrying (making contact) →still image taking→moving image taking→still image taking→carrying (making contact)) can be automatically made by CPU 50 by the simple operation: continuously moving the grip portion 22 to the first position, to the second position and to the third position. Also, a user can clearly recognize the present mode of the digital camera 10 through the geometry of the grip portion 22 and, therefore, can intuitively perform an operation according to the operating mode.

The CPU (changing device) 50 may make powering-on of the digital camera 10 ineffective when the grip portion 22 is in the first position, and may make powering-on of the digital camera 10 effective when the grip portion 22 is in the second position. Powering-on of the digital camera 10 is thereby made ineffective when the digital camera 10 in the first position which is the geometry for carrying, thus preventing an erroneous operation during carrying.

Further, the CPU (selected state changing device) 50 can select the still image taking mode when the position of the grip portion 22 is in the second position, and can select the moving image taking mode when the grip portion 22 is in the third position. That is, the mode is not forcibly changed on the basis of the grip portion 22; the mode suitable in correspondence with the position of the grip portion 22 can be selected.

The embodiment has been described with respect to the digital camera 10 having the liquid crystal monitor 14 provided on the camera body 16. However, the present invention is not limited to the described embodiment. Even a digital camera not having the liquid crystal monitor 14 on the camera body 16 may be constructed so that the back surface of the camera body 16 is covered when the grip portion 22 is folded. This covering is preferable when the camera is carried or made compact.

A second preferred embodiment of the camera according to the present invention will be described. In the second embodiment, the camera is a digital camera.

Figure 8:
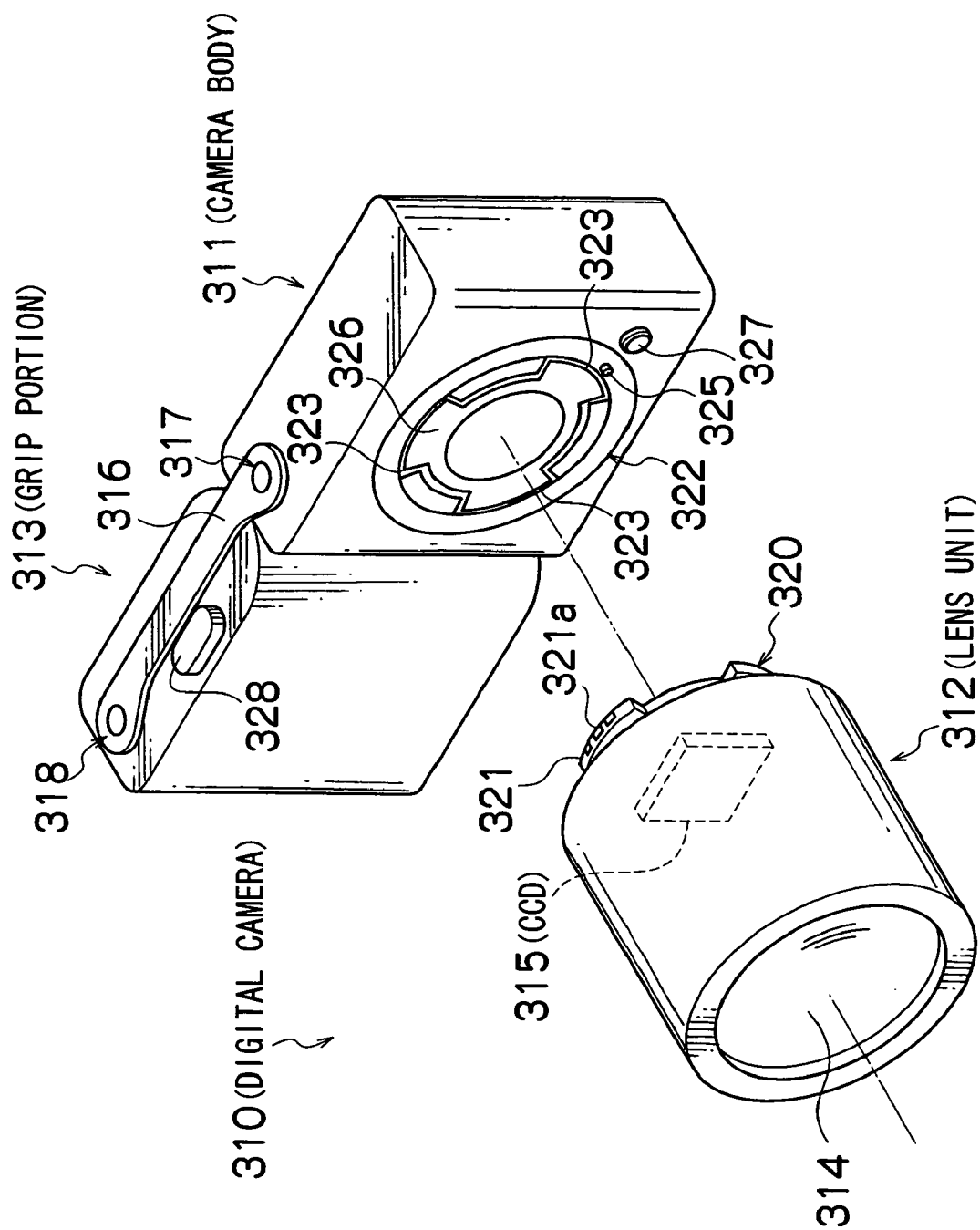
FIG. 8 is a perspective view of the digital camera of a second embodiment schematically showing the construction as seen from the front side.

FIG. 8 is a perspective view of the digital camera 310 seen from the front side. The digital camera 310 is constituted by a camera body 311, a lens unit 312 and a grip portion 313. The lens unit 312 has an image taking lens 314 exposed in a front surface, and a CCD (image pickup device) 315 for performing photoelectric conversion of a subject image formed by the image taking lens 314. The camera body 311 formed into a generally rectangular shape holds the lens unit 312 in a state of being detachably attached thereto. Various control signals are transmitted and received between the camera body 311 and the lens unit 312 to drive the CCD 315 for example, thereby obtaining digital image data according to a subject image.

The grip portion 313 gripped by a cameraperson who performs image taking is formed into a flat rectangular shape having a thickness substantially equal to that of the camera body 311, and is attached to the camera body 311 by a pair of arms 316 disposed in upper and lower positions. One end of each arm 316 formed into the shape of a flat plate is pivoted on a hinge portion 317 (corresponding to the first hinge portion described in the claims) formed on the right end of the camera body 311. The other end of each arm 316 is pivoted on a hinge portion 318 formed on an end of the grip portion 313 (corresponding to the second hinge portion described in the claims). The arms 316 and the grip portions 313 are thereby made freely turnable on an axis corresponding to the top-bottom direction of the camera body 311.

As the lens unit 312, different kinds of lens unit, such as one having an image taking lens 314 having a different focal distance, one having a CCD 315 having a different number of pixels, one capable of monochrome image taking and one capable of infrared image taking, are prepared. One of these lens units 312 is selectively attached to the camera body 311, thus the digital camera 10 can easily obtain image data suitable for image taking conditions.

A mount portion 320 on which bayonet claws 321 are formed is provided in a back surface of the lens unit 312, while a mount portion 322 having bayonet slots 323 formed therein is provided in a front surface of the camera body 311 opposed to the mount portion 320. The mount portions 320 and 322 are fitted to each other by positioning the bayonet claws 321 on the bayonet slots 323, forcing the bayonet claws 321 into the bayonet slots 323 and rotating the bayonet claws 321 clockwise. A plurality of contacts 321a are provided on the bayonet claws 321. The contacts 321a are brought into contact with contacts (not shown) provided in the bayonet slots 323 when the bayonet claws 321 and the bayonet slots 323 are fitted to each other. Thus, the mount portions 320 and 322 mechanically connect the camera body 311 and the lens unit 312 by the bayonet claws 321 and the bayonet slots 323, and also connect the camera body 311 and the lens unit 312 electrically by the contacts.

A lock pin 325 and a mount lid 326 are provided on the mount portion 322. When the lens unit 312 is attached to the camera body 311, the lock pin 325 is brought into engagement with a pin hole (not shown) formed in the mount portion 320 to limit the rotation of the lens unit 312 and to prevent the lens unit 312 from coming off from the camera body 311. The mount lid 326 is forwardly urged by a spring. When the lens unit 312 is not attached, the mount lid 326 closes, from the inside, the opening through which the bayonet claws 321 can enter the bayonet slots 323, thereby preventing dust or the like from entering the interior of the camera body 311.

A lock release button 327 for releasing the lock pin 325 from the engagement is provided in the front surface of the camera body 311 in addition to the mount portion 322. When a depressing operation is performed on the lock release button 327, the lock pin 325 is retracted into the camera body 311 by being interlocked with this operation, thereby disengaging the lock pin 325 and the pin hole. The rotation of the lens unit 312 is thereby permitted again to enable detachment from the camera body 311.

A release button 328 for inputting a command to make the digital camera 310 execute image taking is provided in an upper surface of the grip portion 313. The release button 328 is a switch capable of being depressed in two steps. When the release button 328 is lightly depressed (half depressed), various kinds of image taking preparation processing including automatic exposure (AE) adjustment and automatic focusing (AF) are started. When in this state the release button 328 is again depressed strongly (fully depressed), an image pickup signal for one frame on which the image taking processing has been performed is converted into image data.

Figure 9:
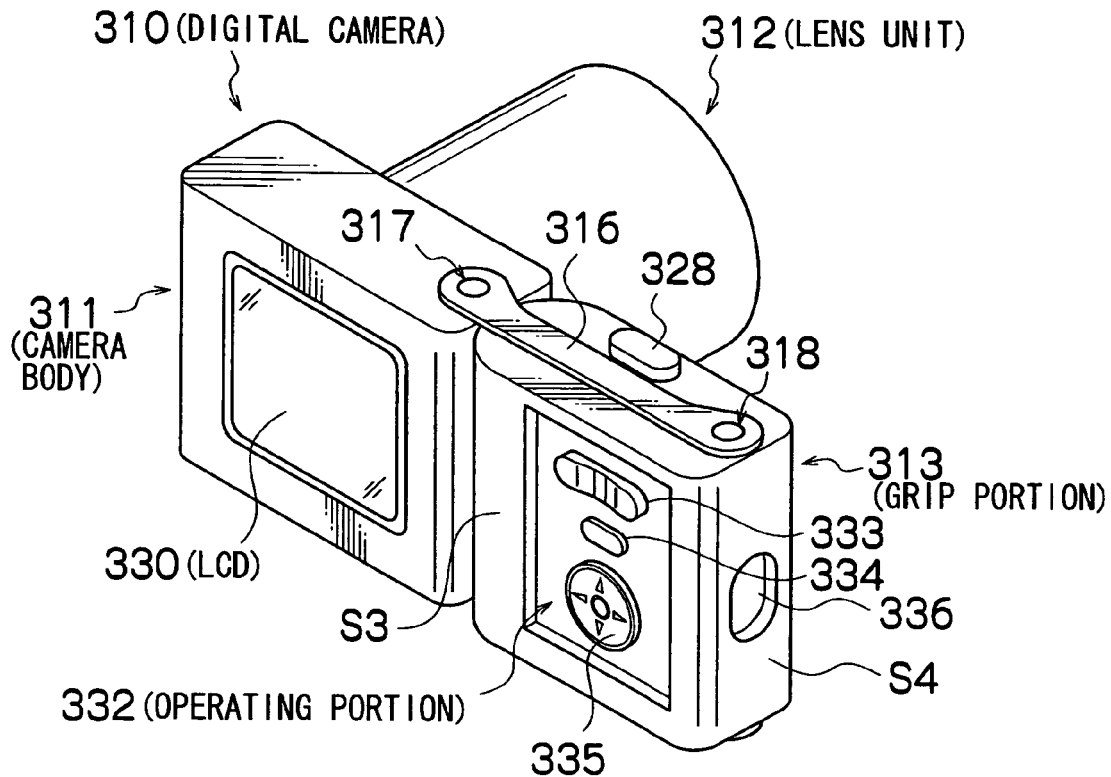
FIG. 9 is a perspective view of an example of setting of a grip portion in a still image taking position as seen from the back side.

FIG. 9 is a perspective view of the digital camera 310 seen from the back side. An LCD (display device) 330 on which a taken image, a through image or a selected one of various menu views is displayed is provided in a back surface of the camera body 311. An operating portion 332 for inputting various commands to the camera body 311 is provided in one side surface S3 of the grip portion 313. In the operating portion 332 are disposed, for example, a zoom operation button 333 for changing the zoom ratio of the image taking lens 314 to a widephoto ratio or a telephoto ratio, a menu button 334 operated when a menu view is displayed on the LCD 330 or when a selection detail is determined, and a cross key 335 for moving a cursor on a menu view.

The digital camera 310 has a still image taking mode in which still image taking is performed, and a moving image taking mode in which moving image taking is performed. The grip portion 313 rotatably attached to the camera body 311 by the arms 316 and the hinge portions 317 and 318 is turned on the hinge portions 317 and 318 to move between a still image taking position shown in FIGS. 8 and 9 (corresponding to the first state described in the claims), which is suitable for still image taking, and a moving image taking position shown in FIG. 10 (corresponding to the second state described in the claims), which is suitable for moving image taking. Setting of each image taking mode of the digital camera 310 is linked to the movement of the grip portion 313 to the corresponding position. The still image taking mode is set by moving the grip portion 313 to the still image taking position, and the moving image taking mode is set by moving the grip portion 313 to the moving image taking position.

Figure 10:
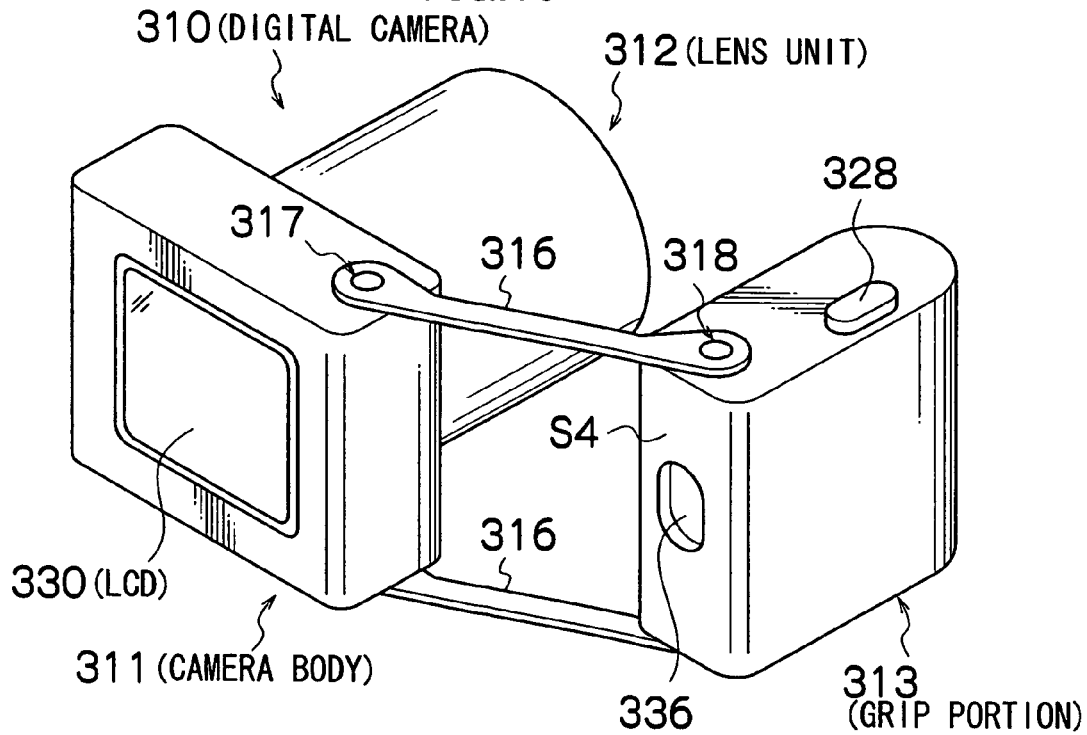
FIG. 10 is a perspective view of an example of setting of the grip portion in a moving image taking position as seen from the back side.

As shown in FIGS. 9 and 10, a REC button 336 for inputting a command to make the digital camera 310 start or stop moving image taking in the moving image taking mode is provided on one side surface S4 of the grip portion 313 facing in a direction parallel to the direction in which the back surface of the camera body 311 faces when the movement to the moving image taking position is completed. When the REC button 336 is pressed one time while the digital camera 310 is in the moving image taking mode, moving image taking is started. When the REC button 336 is again pressed after moving image taking has been started, moving image taking is stopped. The surface of the REC button 336 to be pressed is slightly recessed from the side surface of the grip portion 313 to be prevented from being inadvertently pressed, for example, when the grip portion 313 is gripped in the still image taking mode. The digital camera 310 may also be arranged so that a still image can be taken by depressing the release button 328 even when the digital camera 310 is in the moving image taking mode. The arrangement may alternatively be such that the REC button 336 is not provided but each of a command to start moving image taking and a command to stop moving image taking can be input by depressing the release button 328.

When the digital camera 310 is not in the state of being used, for example, when the digital camera 310 is being carried, the grip portion 313 is moved to a compact position (corresponding to the compact state described in the claims) at which the grip portion 313 is folded so that, as shown in FIG. 4, the hinge portion 318 is positioned at the end opposite from the hinge portion 317. In this compact position, the side surface S3 of the grip portion 313 abuts on the back surface of the camera-body 311 to cover and protect the LCD 330 and the operating portion 332. Also, the digital camera 310 is made smaller in size when the grip portion 313 is set in the compact position than when the grip portion 313 is set in the still image taking position or the moving image taking position by being turned outward from the right side surface of the camera body 311, thus improving the portability of the digital camera 310. It is preferred that, as shown in FIG. 9, the operating portion 332 be formed in a surface one step recessed from the side surface S3 to prevent buttons or the like from being inadvertently pressed by contact with the back surface of the camera body 311. It is also preferred that a click stop mechanism (not shown) for example be provided on each of the hinge portions 317 and 318 to hold the grip portions 313 and the arms 316 at the respective positions.

Figure 12:
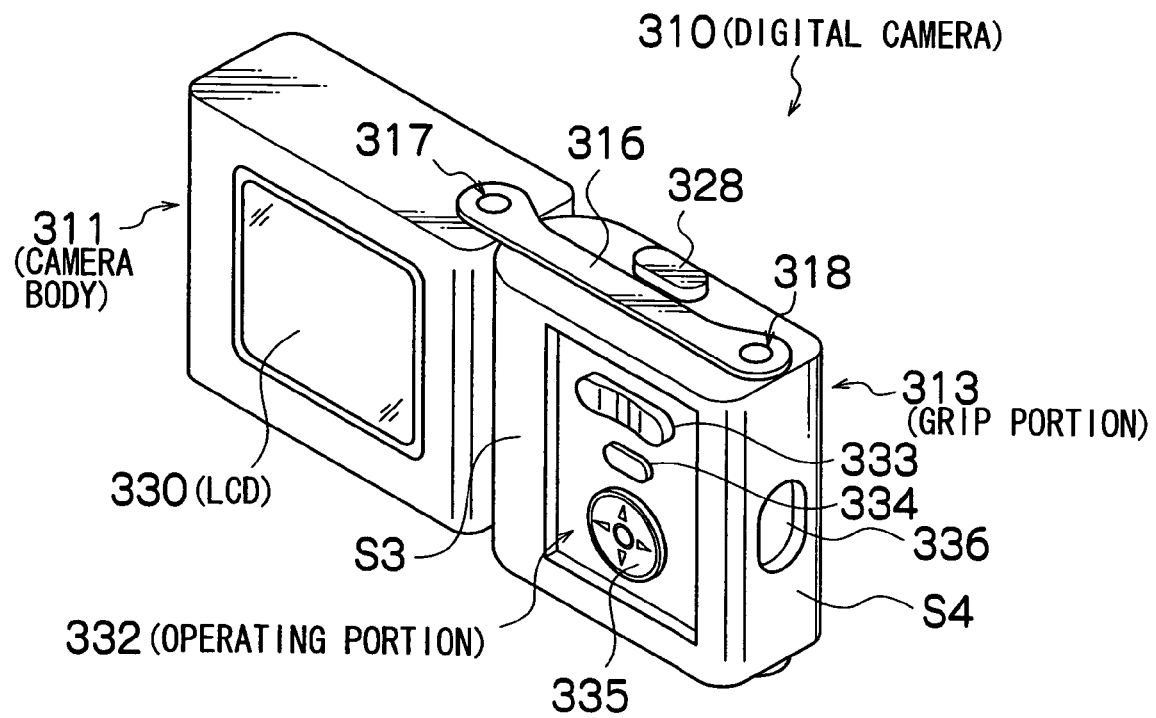
FIG. 12 is a perspective view of a state in which a lens unit is detached, as seen from the back side.

In the digital camera 310, a replay mode for reproducing and displaying on the LCD 330 a still image or a moving image taken in the corresponding image taking mode is also provided as well as the above-described still image taking mode and moving image taking mode. As shown in FIG. 12, this replay mode is set by moving the grip portion 313 to the still image taking position or the moving image taking position when the lens unit 312 is not attached.

Figure 13:
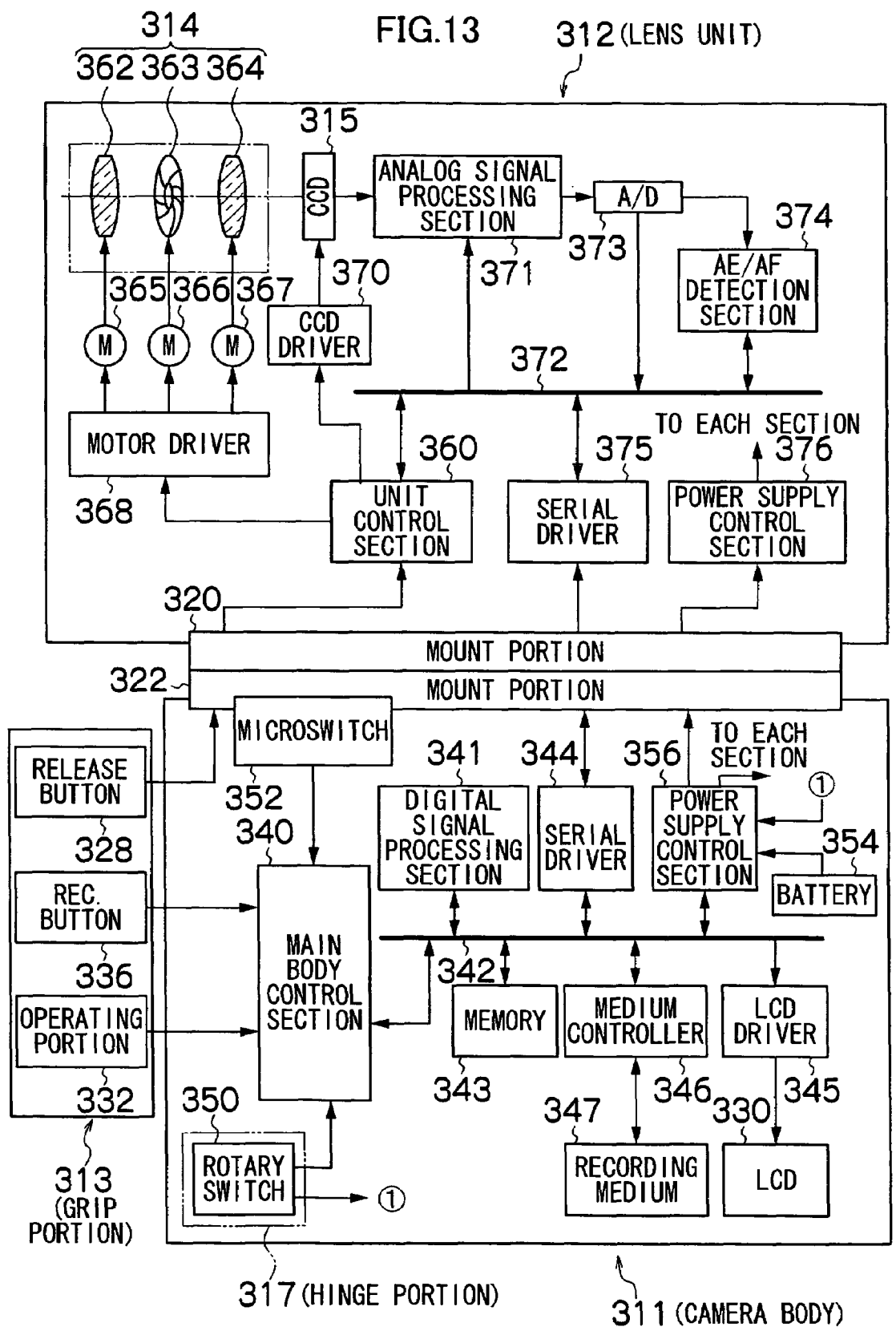
FIG. 13 is a block diagram schematically showing the internal configuration of the digital camera.

FIG. 13 is a block diagram schematically showing the internal configuration of the digital camera 310. A main body control section 340 for performing overall control on the sections in the camera body is provided in the camera body 311. The main body control section 340 has a ROM in which a control program for controlling each section is stored, and a RAM in which data for working is temporarily stored. The main body control section 340 controls each section on the basis of this control program.

A memory 343 is connected to a digital signal processing section 341 via a system bus 342. When image data obtained from the lens unit 312 is temporarily stored in the memory 343, various kinds of image processing such as tone change, white balance correction and gamma correction and other kinds of processing including YC conversion processing are performed on the image data by the digital signal processing section 341.

To the system bus 342 are connected a serial driver 344 for communication with the lens unit 312, an LCD driver 345, a medium controller 346, etc. The serial driver 344 is connected to the lens unit 312 via the contacts provided in the mount portions 320 and 322. The serial driver 344 is capable of bidirectional communication and transmits or receives various control signals or image data to or from the lens unit 312.

The LCD driver 345 displays, for example, input image data on the LCD 330 by converting the image data into an analog composite signal. The media controller 346 writes image data to a recording medium 347 detachably loaded in the camera body 311 or reads out image data from the recording medium 347. When the digital camera 310 is set in the still image taking mode or in the moving image taking mode, image data obtained by the lens unit 312 is recorded on the recording medium 347. When the digital camera 310 is set in the replay mode, image data recording on the recording medium 347 is reproduced and displayed on the LCD 330.

A rotary switch (position detection device) 350 for changing connection paths through a plurality of contacts according to the rotation of an operating shaft is incorporated in the hinge portion 317 of the camera body 311. The operating shaft of the rotary switch 350 rotates with the rotation of the arm 316 on the hinge portion 317. The contacts of the rotary switch 350 are provided in correspondence with the positions of the grip portion 313. The rotary switch 350 changes the connection paths through the contacts according to the movement of the grip portion 313 to detect the position of the grip portion 313. The result of detection by the rotary switch 350 is input to the main body control section 340. The main body control section 340 sets the digital camera 310 in the still image taking mode or in the moving image taking mode according to the result of detection by the rotary switch 350 and thus interlocks the setting of each image taking mode with the movement of the grip portion 313. That is, the main body control section 340 corresponds to the mode setting device described in the claims.

A microswitch (lens detection device) 352 in which the on/off state of contacts is changed by a pressure applied to an operating portion is provided on the mount portion 322. The microswitch 352 is constructed so that the operating portion is pressed by the mount 320 to establish a connection between the contacts when the lens unit 312 is attached to the camera body 311. The microswitch 352 detects whether or not the lens unit 312 is attached according to the connection/non-connection between the contacts and outputs the detection result to the main body control section 340.

The main body control section 340 sets the digital camera 310 in the replay mode in response to the detection of the movement of the grip portion 313 to the still image taking position or the moving image taking position by the rotary switch 350 and the detection of the absence of the lens unit 312 in the attached state by the microswitch 352. It is preferable to enable setting of the replay mode, for example, from a menu view or the like displayed on the LCD 330 by a pressing operation on the menu button 334 even when the lens unit 312 is attached.

The camera body 311 has a battery housing (not shown) in which a battery 354 is removably housed. The battery 354 is connected to a power supply control section (power supply control device) 356 via electrodes provided in the battery housing. The power supply control section 356 transforms the output voltage of the battery 354 to a predetermined voltage and supplies power from the battery to each section in the camera body 311. A contact of the rotary switch 350 corresponding to the compact position is connected to the power supply control section 356. The power supply control section 356 stops supply of power while the rotary switch 350 is detecting the placement of the grip portion 313 in the compact position. The power supply control section 356 starts supply of power in response to the detection of the placement of the grip portion off the compact position by the rotary switch 350. The power supply control section 356 is also connected to the mount portion 322 to supply power to the lens unit 312 via the contacts in the mount portions 320 and 322. Thus, in the digital camera 310, a starting/stop of supply of power is made in linkage with the movement of the grip portion 313 to one of the different positions.

A unit control section 360 for overall control on sections in the lens unit 312 is provided in the lens unit 312. The unit control section 360 has a ROM in which a control program for controlling each section is stored, and a RAM in which data for working is temporarily stored. The unit control section 360 controls each section on the basis of this control program.

The image taking lens 314 is constituted by a zoom lens 362, a diaphragm 363 and a focusing lens 364 disposed along an optical axis. A lens motor 365 is connected to the zoom lens 362. The lens motor 365 moves the zoom lens 362 to a widephoto position or a telephoto position while being interlocked with an operation on the zoom operation button 333. An iris motor 366 is connected to the diaphragm 363. In image taking preparation processing accompanying half depression of the release button 328, the iris motor 366 changes the opening area (aperture value) of the diaphragm 363 to adjust the quantity of incident light from the zoom lens 362. A lens motor 367 is connected to the focusing lens 364. With a change in the zoom ratio of the zoom lens 362 or half depression of the release button 328, the lens motor 367 moves the focusing lens 364 toward the nearest focus position or the infinity focus position.

The motors 365, 366, and 367 are connected to a motor driver 368 connected to the unit control section 360. The motor driver 368 transmits drive pulses to the motors 365, 366, and 367 on the basis of control signals from the unit control section 360. The motors 365, 366, and 367 drive and rotate the rotating shafts. For example, a stepping motor or the like is used as each of the motors 365, 366, and 367.

The CCD 315 is connected to the unit control section 360 via a CCD driver 370. The unit control section 360 controls the CCD driver 370 to drive the CCD 315. The CCD 315 converts a subject image into an electrical signal by photoelectric conversion to obtain image data in analog signal form.

The CCD 315 is connected to an analog signal processing section 371 and outputs obtained image data to the analog signal processing section 371. The analog signal processing section 371 is connected to the unit control section 360 via a system bus 372 and is controlled by the unit control section 360. The analog signal processing section 371 performs processing including noise removal processing and amplification processing on image data and outputs the processed image data to an A/D converter 373. The A/D converter 373 converts the image data in analog signal form into a digital signal.

An AE/AF detection section 374 is connected to the A/D converter 373. The A/D converter 373 inputs the converted image data in digital signal form to the AE/AF detection section 374. The AE/AF detection section 374 is controlled by the unit control section 360, detects an in-focus position at which the amplitude value of a high-frequency component of the image data is maximized, and outputs the detection value to the unit control section 360. Further, the AE/AF detection section 374 detects an AE detection value at which the amount of exposure is optimized, and outputs the detected AE detection value to the unit control section 360. The unit control section 360 performs AF processing by moving the focusing lens 364 to a position at which the AF detection value is maximized, and controls the operations of the components including the diaphragm 363 and the CCD 315 on the basis of the AE detection value, thus performing image taking preparation processing.

A serial driver 375 is connected to the system bus 372 as well as the above-described sections. The serial driver 375 is connected to the serial driver 344 in the camera body 311 via the mount portions 320 and 322. Each of the serial drivers 344 and 375 converts a parallel signal from the control section 340 or 360 into a serial signal, transmits the serial signal, restores a parallel signal from a received signal, and inputs the restored parallel signal to the control section 340 or 360. Thus, control signals and image data are transmitted and received between the camera body 311 and the lens unit 312.

A power supply control section 376 is connected to the mount portion 320 and is connected to the power supply control section 356 in the camera body 311 via the contacts in the mount portions 320 and 322. When the power supply control section 376 is supplied with power from the power supply control section 356, it distributes the power to the sections in the lens unit 312.

The grip portion 313 is mechanically connected to the camera body 311 by the arms 316, and is also connected electrically to the camera body 311 by wiring passed through the arms 316 to enable operation commands from the release button 328, the operating portion 332 and the REC button 336 to be input to the camera body 311. It is preferable to use, for example, a flexible wiring substrate or the like as the wiring connecting the camera body 311 and the grip portion 313 to allow the rotation at the hinge portions 317 and 318.

The operating portion 332 and the REC button 336 are connected to the main body control section 340. The release button 328 is connected to the unit control section 360 via the camera body 311 and the mount portions 320 and 322. The release button 328 is a switch capable of being depressed in two steps, as described above. Correspondingly, a shutter release signal from the release button 328 is changed in two steps in correspondence with half depression and full depression. The unit control section 360 carries out image taking preparation processing as described above by controlling the AE/AF detection section 374 in response to half depression of the release button 328, and carries out image taking of subject light in response to full depression of the release button 328.

Figure 11:
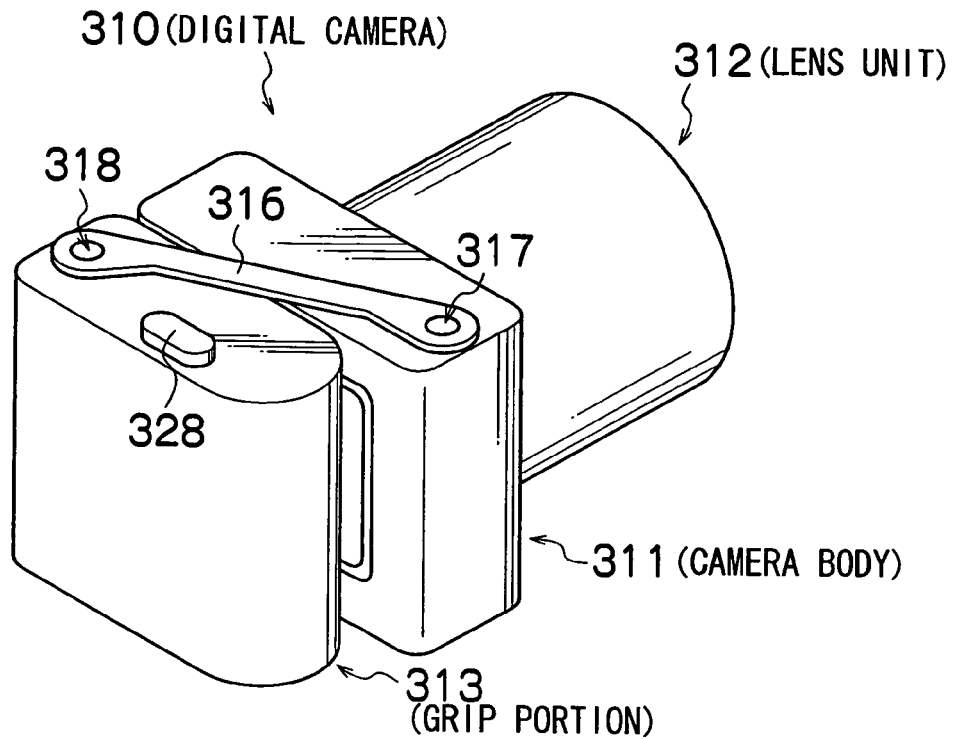
FIG. 11 is a perspective view of an example of setting of the grip portion in a compact position as seen from the back side.

The operation of the digital camera 310 constructed as described above will be described. When the digital camera 310 is not used, the grip portion 313 is in the compact position (see FIG. 11). The grip portion 313 in the compact position abuts on the back surface of the camera body 311 to protect the LCD 330. Thus, breakage of the LCD 330 during carrying can be prevented with reliability even if the LCD 330 has a large screen occupying substantially the entire area of the back surface of the camera body 311. In the compact position, the camera body 311 and the grip portion 313 each formed into a generally rectangular shape are superposed on each other each by being oriented in a flat position. The desired portability is thus ensured. Further, in this embodiment, the operating portion 332 is provided in the side surface S3 of the grip portion 313 that abuts on the back surface of the camera body 311 in the compact position. The camera body 311 and the grip portion 313 also cover the operating portion 332 to prevent damage to the operating buttons during carrying.

To perform still image taking with the digital camera 310, the lens unit 312 is first attached to the camera body 311 in the state where the grip portion 313 is in the compact position. The grip portion 313 is then moved to the still image taking position (see FIGS. 8 and 9). The movement of the grip portion 313 to the still image taking position is performed by turning the arms 316 on the hinge portions 317 so that the arms 316 project in a direction perpendicular to the right side surface of the camera body 311, and by turning the grip portion 313 on the hinge portions 318 so that the grip portion 313 overlaps the arms 316. The grip portion 313 is thereby moved to the still image taking position at which the back surface of the camera body 311 and the side surface S3 of the grip portion 312 are parallel to each other and the back surfaces of the camera body 311 and the operating portion 332 face in the same direction.

When the arms 316 are turned on the hinge portions 317, the rotary switch 350 incorporated in the hinge portion 317 changes the connection between the contacts according to the rotation to detect the movement of the grip portion 313 to the still image taking position. When the movement of the grip portion 313 from the compact position is detected by the rotary switch 350, the power supply control section 356 transforms the voltage of the battery 354 and supplies the transformed voltage to the sections in the camera body 311. The power supply control section 356 also supplies power to the power supply control section 376 in the lens unit 312 via the contacts in the mount portions 320 and 322. The power supply control section 376 supplied with the power distributes the power to the sections in the lens unit 312. The main body control section 340 started up by being supplied with power from the power supply control section 356 conforms that the grip portion 313 is in the still image taking position on the basis of the result of detection by the rotary switch 350, and sets the digital camera 310 in the still image taking mode. The digital camera 310 is thus set in the state of being able to perform still image taking.

When the grip portion 313 is in the still image taking position, the cameraperson can hold the digital camera 310 in a so-called single-lens reflex camera style holding the grip portion 313 by the right hand and supporting the lens unit 312 by the left hand. Holdability with improved stability is thus ensured to reduce the occurrence of camera shake in still image taking for example. In still image taking, the cameraperson can operate the release button 328 by the forefinger of the right hand and operate the operating portion 332 by the thumb of the right hand since the operating portion 332 facing in frontward on the camera body 311 in the compact position faces rearward in the still image taking position. Thus, according to the present embodiment, the digital camera 310 can be obtained as a camera having both improved safety during carriage and improved operability.

To perform moving image taking with the digital camera 310, the grip portion 313 is moved from the state in the still image taking position to the moving image taking position (see FIG. 10) in such a manner that the arms 316 are turned frontward on the hinge portions 317 to the rotary switch 350 detection position, and the grip portion 313 is turned on the hinge portions 318 until the back surface of the camera body 311 and the side surface S3 of the grip portion 313 become perpendicular to each other. When the grip portion 313 is moved to the moving image taking position, the connection between the contacts of the rotary switch 350 is changed and the rotary switch 350 thereby detects the movement to the moving image taking position. The main body control section 340 sets the moving image taking mode according to the result of detection by the rotary switch 350, thereby setting the digital camera 310 in the state of being able to perform moving image taking.

When the grip portion 313 in the still image taking position is held, it is necessary to pinch the grip portion 313 by a substantially large force by hooking the fingers because the grip portion 313 is pinched in the small-thickness direction. This posture is suitable for still image taking in which importance is attached to holdability, but it soon causes fatigue and is not suitable for moving image taking requiring a long image taking time in comparison with still image taking. On the other hand, when the grip portion 313 in the moving image taking position is held, a holding force can be applied in a direction along a suitably increased thickness and the thumb can be passed between the arms 316 to wrap the grip portion in the hand, so that fatigue can be limited even during long-time image taking with one hand. In this embodiment, the arms 316 are turned slightly forward to change the connection between the contacts in the rotary switch 350 when the grip portion 313 is moved to the moving image taking position. The angle of this turning, however, may be freely set in the range in which the hinge portions 318 are positioned outside the right side surface of the camera body 311.

When the lens unit 312 is removed (see FIG. 12) in the state where the grip portion 313 is in the still image taking position or in the moving image taking position, the microswitch 352 detects the absence of the lens unit 312 in the attached state. The main body control section 340 sets the digital camera 310 in the replay mode according to this detection. Setting of each mode and switching between the on/off state of the power supply are performed by changing the form of the digital camera 310, as described above. Therefore, a further improvement in operability can be expected and it is possible to instantly identify the state of the digital camera 310 by recognizing the form.

In the above-described embodiment, the arrangement for facilitating use by a right-handed cameraperson is adopted, in which the hinge portions 317 are provided on right end portions of the camera body 311 and the grip portion 313 in the still image taking position or in the moving image taking position is turned outside the right side surface of the camera body 311. However, the arrangement may alternatively be such that the grip portion 313 is reversely turned outside the left side surface.

In the above-described embodiment, the grip portion 313 is moved to the still image taking position and to the moving image taking position in correspondence with still image taking and moving image taking. However, each of still image taking and moving image taking may be performed at one of the two positions. Also, the position of the grip portion 313 at the time of image taking is not limited to the above-described still image taking position and moving image taking position. The position of the grip portion 313 may be any position set by turning outside one side surface of the camera body 311. If the grip portion 313 is positioned outside one side surface of the camera body 311, no part of the grip portion 313 and the hand or fingers does overlap the display device, e.g., the LCD 330 provided in the back surface of the camera body 311 and, therefore, the display device is easy to view. Also, the facility with which the grip portion 313 is held is improved because interference with the camera body 311 or the lens unit 312 can be avoided. Further, the present invention is not limited to the digital camera with which each of still image taking and moving image taking is performed. The present invention may be applied to a camera for one of still image taking and moving image taking.

In the above-described embodiment, each arm 316 is in the form of a flat plate. However, the shape of each arm 316 is not limited to the form of a flat plate and may be provided in the form of a round rod or a rectangular column. Also, only one arm for supporting in a cantilever manner may be provided in place of the pair of upper and lower arms. Further, the connection position is not limited to the upper or lower position. Cutouts are formed in the camera body 311 and the grip portion 313 at an arbitrary position in the top-bottom direction of the camera body 311 to connect the camera body 311 and the grip portion 313. In the above-described embodiment, the link mechanism described in the claims is constituted by the arms 316 and the hinge portions 317 and 318, and the grip portion 313 is turned. However, the present invention is not limited to this. For example, in a case where a still image taking position and a moving image taking position are not set separately from each other, the grip portion 313 may be moved in a sliding manner.

In the above-described embodiment, the rotary switch 350 is provided as the position detection device, but the position detection device is not limited to the rotary switch 350. For example, limit switches may be provided in correspondence with the different positions of the grip portion 313, and the positions may be detected through the detection of the on/off states of the limit switches. The place in which the position detection device is provided is not limited to the hinge portion 317. For example, the position detection device may be provided on the hinge portion 318. Further, a power button and a mode change switch may be provided instead of the arrangement for image taking mode switching and power on/off control linked to the operation of the grip portion 313.

In the above-described embodiment, the microswitch 352 is provided as the lens detection device, but the lens detection device is not limited to the microswitch 352. For example, an optical sensor or a magnetic sensor may be used for detection of the lens. Further, an input/output port capable of producing a change in voltage from high to low in response to the attachment of the lens unit 312 by utilizing contacts in the mount portions 320 and 322 may be provided in the main body control section 40.

The above-described embodiment is an example of application of the present invention to the digital camera 310 in which the lens unit 312 incorporating the image taking lens 314 and the CCD 15 is detachably attached to the camera body 311. However, the present invention is not limited to the described example. The present invention may be applied, for example, to a single-lens reflex type of digital camera in which a CCD is provided on the camera body side and only an image taking lens is detachably attached to the camera body, and to a compact-type digital camera in which an image taking lens is integrally combined with the camera body.

What is claimed is:

1. A digital camera having a display device on which an image taken by an image pickup element or an image recorded on a recording medium is displayed, the camera comprising:

a camera body having the display device provided in its back surface;

a grip portion attached to the camera body and capable of moving between a compact state in which it is positioned on the back surface of the camera body to cover the display device and a holdable state in which it is positioned outside a side portion of the camera body; and a mode setting device which sets at least a still image taking mode and a moving image taking mode;

wherein each of the camera body and the grip portion is formed into a generally rectangular shape, and the grip portion in the holdable state has a first state in which its surface opposed to the back surface when the grip portion is in the compact state is generally parallel to the back surface, and a second state in which the opposed surface and the back surface are made generally perpendicular to each other by turning on an axis in a top-bottom direction of the camera body, further comprising:

a position detection device which detects the state of the grip portion, and which is provided on one of the camera body and the grip portion, wherein the mode setting device sets, based on the detection result of the position detection device, a mode other than moving image taking mode when the grip portion is in the first state, and sets the moving image taking mode when the grip portion is in the second state.

2. The digital camera according to claim 1, wherein the camera body is constructed so that an image taking lens through which subject light is imaged on the image pickup element can be detachably attached to the camera body, the camera body having a lens detection device which detects the existence/nonexistence of the image taking lens, and wherein the mode setting device sets a replay mode when the lens detection device detects the absence of the image taking lens.

3. The digital camera according to claim 1, wherein the grip portion has in the opposed surface an operating portion for inputting various commands to the camera body, and the back surface and the opposed surface are made generally parallel to each other and the opposed surface faces in the same direction as the back surface when the grip portion is in the first state.

4. The digital camera according to claim 1, wherein the camera body has a power supply control device which supplies power to components, the power supply control device supplying power in response to the detection of the holdable state of the grip portion by the position detection device, the power supply control device stopping supplying power in response to the detection of the compact state of the grip portion by the position detection device.

5. A digital camera having a display device on which an image taken by an image pickup element or an image recorded on a recording medium is displayed, the camera comprising:

a camera body having the display device provided in its back surface;

a grip portion attached to the camera body and capable of moving between a compact state in which it is positioned on the back surface of the camera body to cover the display device and a holdable state in which it is positioned outside a side portion of the camera body, wherein the grip portion is attached to the camera body by a link mechanism which turnably supports each of the grip portion and the camera body, wherein each of the camera body and the grip portion is formed into a generally rectangular shape, and the grip portion in the holdable state has a first state in which its surface opposed to the back surface when the grip portion is in the compact state is generally parallel to the back surface, and a second state in which the opposed surface and the back surface are made generally perpendicular to each other by turning on an axis in a top-bottom direction of the camera body, wherein the link mechanism is constituted by an arm formed into the shape of a plate or a rod, a first hinge portion which is formed on a side end portion of the camera body and which turnably supports one end of the arm on an axis in a top-bottom direction, and a second hinge portion which is formed on an end of the grip portion and which turnably supports the other end of the arm on an axis in a top-bottom direction;

the grip portion is moved to the compact state while covering the display device so that the second hinge portion is positioned at an end opposite from the first hinge portion;

the grip portion is moved to the first state in which the opposed surface and the back surface are generally parallel to each other and in which the opposed surface faces in the same direction as the back surface, by turning the arm so that the arm projects in a direction generally perpendicular to one side surface of the camera body at which the first hinge portion is formed, and by turning the grip portion so that the grip portion overlaps the arm; and the grip portion is moved to the second state by turning the arm so that the second hinge portion is positioned outside the one side surface of the camera body at which the first hinge portion is formed, and by turning the grip portion so that the opposed surface becomes generally perpendicular to the back surface.

6. A digital camera having a display device on which an image taken by an image pickup element or an image recorded on a recording medium is displayed, the camera comprising:

a camera body having the display device provided in its back surface;

a grip portion attached to the camera body and capable of moving between a compact state in which it is positioned on the back surface of the camera body to cover the display device and a holdable state in which it is positioned outside a side portion of the camera body; and a mode setting device which sets at least a still image taking mode and a moving image taking mode;

wherein each of the camera body and the grip portion is formed into a generally rectangular shape, and the grip portion in the holdable state has a first state in which its surface opposed to the back surface when the grip portion is in the compact state is generally parallel to the back surface, and a second state in which the opposed surface and the back surface are made generally perpendicular to each other by turning on an axis in a top-bottom direction of the camera body, further comprising:

a position detection device which detects the state of the grip portion, and which is provided on one of the camera body and the grip portion, wherein the mode setting device is capable of setting, based on the detection result of the position detection device, a still image taking mode when the grip portion is in the first state, and sets a moving image taking mode when the grip portion is in the second state.

* * * * *